US012688841B1

(12) United States Patent
Horoub et al.

(10) Patent No.: US 12,688,841 B1
(45) Date of Patent: Jul. 21, 2026

(54) NOISE CANCELLING DEVICE

(71) Applicant: King Fahd University of Petroleum and Minerals, Dhahran (SA)

(72) Inventors: Mamon Horoub, Dhahran (SA); Ammar Alzaydi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/392,740

(22) Filed: Nov. 18, 2025

(30) Foreign Application Priority Data

Nov. 12, 2025 (SA) ................................ 1020258431

(51) Int. Cl.
G10K 11/16 (2006.01)
F01N 1/08 (2006.01)
(Continued)

(52) U.S. Cl.
CPC ............ G10K 11/161 (2013.01); F01N 1/089 (2013.01); F01N 1/161 (2013.01); G05D 3/121 (2013.01); F01N 2490/04 (2013.01)

(58) Field of Classification Search
CPC . F01N 1/003; F01N 1/02; F01N 1/026; F01N 1/089; F01N 1/16; F01N 1/161; F01N 1/166; F01N 1/168; F01N 2490/02; F01N 2490/04; F01N 2490/12; F01N 2490/15; F01N 2490/155; G10K 11/16;
(Continued)

(56) References Cited

U.S. PATENT DOCUMENTS 1,187,581 A * 6/1916 Weil ........................ F01N 1/166
181/241
2,943,641 A * 7/1960 Arnold ................ F04B 39/0055
417/540
(Continued)

FOREIGN PATENT DOCUMENTS

CN 103486394 A * 1/2014 ............ F16L 55/033
CN 207212622 U 4/2018
(Continued)

OTHER PUBLICATIONS

Niloofar Damyar, et al., "Acoustical Performance of a Double-Expansion Chamber Muffler: Design and Evaluation", Health Scope, vol. 11, Issue 1, Apr. 8, 2022, 7 pages.

*Primary Examiner* — Edgardo San Martin
(74) *Attorney, Agent, or Firm* — Oblon, McClelland, Maier & Neustadt, L.L.P.

(57) ABSTRACT
A noise cancelling device includes first and second expansion chambers, both cylindrical and equipped with double-wall inlet and outlet extension pipes. Each expansion chamber includes two elements: the first elements includes first and second cylindrical portions with differing diameters, and the second element includes a third cylindrical portion connecting to a connecting pipe. The second element is slidingly engaged with the first element to form a cylindrical body. The expansion chambers, the connecting pipe, and the extension pipes form a unitary body, and axially aligned along a longitudinal axis in the order of inlet extension pipe, first expansion chamber, connecting pipe, second expansion chamber, and outlet extension pipe. The device has a plane of symmetry perpendicular to the longitudinal axis at a center point of the connecting pipe.

20 Claims, 21 Drawing Sheets

(51) Int. Cl.
F01N 1/16 (2006.01)
G05D 3/12 (2006.01)

(58) Field of Classification Search
CPC ..... G10K 11/161; G10K 11/172; F16L 55/04;
F16L 55/045; F16L 55/02; F16L 55/033
See application file for complete search history.

(56) References Cited

U.S. PATENT DOCUMENTS 3,726,092 A * 4/1973 Raczuk ................... F01N 1/166
60/314
3,807,527 A * 4/1974 Bergson ................. F01N 1/089
181/232
3,853,200 A * 12/1974 Bergson ................... F01N 1/08
181/232
4,880,078 A * 11/1989 Inoue ................. B29C 66/1312
181/246
5,475,189 A * 12/1995 Field ................... F16L 55/0333
181/403
6,698,390 B1 * 3/2004 Kostun ............. F02M 35/1266
181/241
7,077,093 B2 * 7/2006 Koelmel ............... F02B 27/021
123/184.57
7,757,808 B1 * 7/2010 Vaz ................... F02M 35/1272
181/241
10,071,664 B2 * 9/2018 Lem ..................... G10K 11/161
11,815,198 B2 * 11/2023 Smith ................... F16L 55/033

FOREIGN PATENT DOCUMENTS

CN 114863900 A 8/2022
CN 118840988 A * 10/2024 .......... G10K 11/162
CN 110220295 B 11/2024
DE 2134178 A1 * 9/1972
DE 4105057 A1 * 8/1992 ............ F01N 1/166
DE 102020213854 A1 * 5/2022 ............. F01N 1/02
FR 328252 A * 7/1903
FR 2510184 A1 * 1/1983 ............ F01N 1/089
GB 398359 A * 9/1933 ............. F01N 1/02
GB 2162894 A * 2/1986 ............ F02B 27/06
JP 2002-242651 A 8/2002
KR 200148695 Y1 * 6/1999 ............ F01N 1/165
KR 100360911 B1 * 11/2002 ............ F01N 1/161
WO WO-9321428 A1 * 10/1993 ............. F01N 1/16

* cited by examiner

NOISE CANCELLING DEVICE

CROSS-REFERENCE TO RELATED APPLICATION

The present disclosure claims the benefit of Saudi Patent Application No. 1020258431, filed on Nov. 12, 2025 with the Saudi Authority for Intellectual Property Office, which is incorporated herein by reference in its entirety.

STATEMENT OF PRIOR DISCLOSURE BY AN INVENTOR

Aspects of the present disclosure are described in Salamah, A., Tiyah, D. & Horoub, M. "Transmission Loss Analysis for a Silencer with an Infinite Number of Expansion Chambers Using the Transfer Matrix Method." *Arabian Journal for Science and Engineering* (2025), which is incorporated herein by reference in its entirety.

BACKGROUND

Technical Field

The present disclosure is directed to a noise cancelling mechanism, system and method for sound reduction, and particularly, to an adaptive noise cancelling device, system and method for controlling transmission loss and noise frequency band.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Noise cancelling devices are important in many industries to reduce unwanted sound, particularly in environments where a flow of gas is involved, such as combustion engines, and industrial gas lines. Expansion chamber designs are a common approach to noise cancellation in these scenarios. These chambers typically rely on the alteration of sound wave paths, allowing destructive interference to attenuate noise. The chambers are designed to interrupt the direct path of sound waves, effectively diminishing their energy before they can propagate further. Such designs leverage the principle of wave reflection and interference to cancel or reduce specific frequencies effectively.

One of the significant challenges with expansion chamber designs is optimizing the chamber's size and shape to target specific frequencies while balancing physical space constraints. The design must account for the wavelengths of noise that are most prominent in the system, which may require dynamic tuning if the noise source varies over time or operation mode. Moreover, the expansion chamber must effectively manage the gas flow to prevent unnecessary back pressure, which could affect system performance or lead to inefficiencies.

Traditional exhaust noise reduction systems, particularly fixed mufflers, face limitations in effectively addressing the varying acoustic conditions encountered in different operational scenarios. These systems are prevalent in noisy machinery, such as automobiles, trucks, and generators. The primary drawback of conventional mufflers is their inability to adapt dynamically to changes in noise levels and frequencies, restricting their noise attenuation performance. As these systems rely on a static approach to sound dampening, they are often insufficient in providing optimal noise reduction across the diverse range of operational environments that machinery operates under. This limitation results in suboptimal performance, leading to persistent noise issues that can impact both the functionality and environmental compliance of the machinery.

CN114863900 describes a multi-stage expansion silencer designed to improve noise reduction across a wide frequency range. It uses multiple connected expansion cavities with inner insertion pipes to effectively eliminate low, medium, and high-frequency noise. This design improves silencing performance, saves installation space, and reduces production costs.

CN207212622 describes a silencer having a shell with intake and outlet pipes, and includes a movable structure inside that forms an expansion chamber. As air flows through, it expands within this chamber, and the movable structure can shift back and forth with the airflow. This design enables noise reduction across various frequencies, and help ot meet space and weight constraints.

Conventional devices for silencing noise lack real time modification of chamber dimensions based on acoustic feedback received from a signal processing technique known as the chirp function.

Accordingly, it is one object of the present disclosure to provide a noise cancelling device, system and method that transforms traditional silencer designs by incorporating mechanically adaptive expansion chambers. Further, the noise cancelling device, system and method may utilize a signal processing technique (e.g., chirp function) to adjust chamber lengths in real time, based on acoustic feedback, to have better control over transmission loss values and the noise frequency stopband.

SUMMARY

In an exemplary embodiment, a noise cancelling device is disclosed. The noise cancelling device includes a first expansion chamber and a second expansion chamber, each having a cylindrical shape with a first end and a second end. The noise cancelling device further includes an inlet extension pipe having a double wall connected to the first end of the first expansion chamber, an outlet extension pipe having a double wall connected to the first end of the second expansion chamber, and a connecting pipe connecting the second end of the first expansion chamber and the second end of the second expansion chamber. Each expansion chamber includes a first element including a first cylindrical portion having a double wall and a first diameter, a first circular base connecting to the first cylindrical portion, and a second cylindrical portion connecting to the first circular base having a double wall and a second diameter. The first and second cylindrical portions are axially aligned. Further, the first diameter is larger than the second diameter. The first cylindrical portion has an extending outer lip and the second cylindrical portion is slidingly engaged with the extension pipe. An inner wall of the second cylindrical portion is disposed in a gap of the double wall of the extension pipe. The expansion chamber further includes a second element including a third cylindrical portion having a third diameter, and a second circular base connecting to the third cylindrical portion and the connecting pipe. The second element is slidingly engaged in a gap of the double wall of the first element to form a cylindrical body. Each of the expansion chambers, the connecting pipe, and the extension pipes have an inner diameter and an outer diameter. The expansion chambers, the connecting pipe, and the extension pipes form a unitary body, wherein the expansion chambers, the connecting pipe, and the extension pipes are axially aligned along a longitudinal axis of all the cylindrical portions in the order of inlet extension pipe, first expansion chamber, connecting pipe, second expansion chamber, and outlet extension pipe, having a plane of symmetry perpendicular to the longitudinal axis at a center point of the connecting pipe.

In some embodiments, the connecting pipe and the second cylindrical portion of each expansion chamber have the same inner diameter.

In some embodiments, the first element of each expansion chamber is movable, and an elastomeric lining is present between an inner contacting surface of the first element and the second element to form an interior surface having a single diameter when the elastomeric lining is in a resting state.

In some embodiments, the expansion chambers are configured to be extended or retracted by adjusting a length of the expansion chamber.

In some embodiments, the connecting pipe is a fix-length pipe.

In some embodiments, the connecting pipe and each of the expansion chambers have the same length at a default position.

In some embodiments, the connecting pipe has an inner diameter smaller than the inner diameter of the expansion chamber.

In some embodiments, each extension pipe further includes a plurality of springs configured to return the first element of each expansion chamber at the default position.

In some embodiments, each extension pipe has an inner diameter smaller than the inner diameter of the expansion chamber.

In some embodiments, the inner diameter of each extension pipe is same as the inner diameter of the connecting pipe.

In some embodiments, the noise cancelling device further includes a control system to actuate a size of the expansion chamber by adjusting a length of the expansion chamber. The control system includes a controller, an actuator mounted on an outer wall of the extension pipe and connected to the first base of the expansion chamber through a cable, and a sensor for the expansion chamber on the actuator. The controller includes a circuitry configured to receive and process data from the sensor and giving commands to the actuator. The actuator is configured to execute commands from the controller to adjust the length of each expansion chamber, and detect the length of the expansion chamber.

In some embodiments, the controller receives the data from the sensor either through a cable or a wireless transmission.

In some embodiments, the controller gives commands to the actuator through a cable or a wireless transmission.

In some embodiments, the controller gives commands based on a chirp function's feedback.

In some embodiments, a transmission loss in the noise cancelling device follows a mathematical description as:

$$TL_{double\ chamber} =$$

$$20Log_{10}\left[\left[\frac{(m+1)^2}{4m}e^{ikL_1} + \frac{(1-m)(m-1)}{4m}e^{-ikL_1}\right]\left[\frac{(1+n)^2}{4n}e^{ik(L_2+L_3)} + \right.\right.$$

$$\left.\frac{(1-n)(n-1)}{4n}e^{ik(L_2-L_3)}\right] + \left[\frac{(1+m)(m-1)}{4m}e^{ikL_1} + \frac{(1-m)(m+1)}{4m}e^{-ikL_1}\right]$$

$$\left.\left[\frac{(1-n)(n+1)}{4n}e^{ik(L_3-L_2)} + \frac{(1+n)(n-1)}{4n}e^{-ik(L_2+L_3)}\right]\right],$$

wherein i is the standard imaginary unit, m represents an area ratio between the first expansion chamber and the connecting pipe, n represents an area ratio between the second expansion chamber and the connecting pipe, L1 represents the length of the first expansion chamber, L2 represents the length of the connecting pipe, and L3 represents the length of the second expansion chamber.

In some embodiments, the noise cancelling device has a stopband location either to a left or right of the center frequency within a frequency spectrum of 0 to 5000 Hz.

In some embodiments, the expansion chambers are capable of adjusting their lengths in real-time.

In some embodiments, a method of noise reduction on a system providing a flow of gas using the noise cancelling device is disclosed. The method includes connecting the noise cancelling device to a gas exhaust/flow to generate acoustic signals, processing the acoustic signals to generate a feedback, and adjusting the lengths of expansion chamber based on the feedback to reduce the noise.

In some embodiments, the method reduces noise within a frequency spectrum of 0 to 5000 Hz.

In some embodiments, the system provides a flow of gas selected from the group consisting of exhaust system, car muffler system, air handling system, ducted pumps, air discharge line, and compressors.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
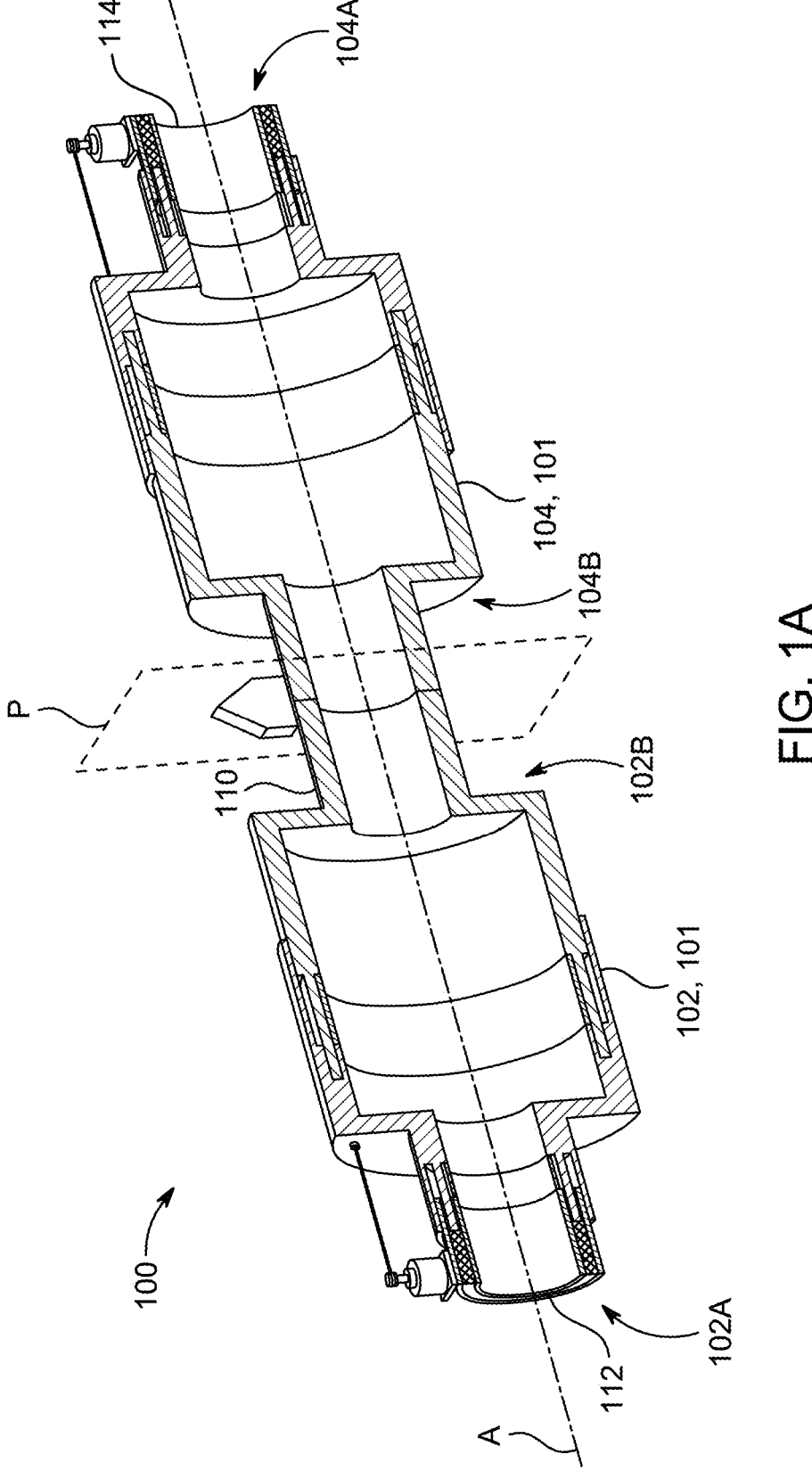
FIG. 1A is a cross-sectional perspective view of a noise cancelling device, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately", "approximate", "about" and similar terms generally refer to ranges that include the identified value within a margin of 20%, 10%, or preferably 5%, and any values therebetween.

Aspects of the present disclosure are directed to a noise cancelling device having mechanically adaptive expansion chambers. Unlike traditional mufflers with fixed geometry, the noise cancelling device incorporates chambers whose length can be dynamically adjusted in real time. The adjustment is based on continuous acoustic feedback processed using a "chirp function", a signal with variable frequency over time. The chirp function enables the noise cancelling device to analyze the changing frequency characteristics of noise and alter length of the expansion chambers, either increasing or decreasing the length as needed. Such modulation allows the noise cancelling device to precisely target and neutralize unwanted noise frequencies, shifting the effective stopband within the frequency spectrum for optimal noise attenuation. The adaptive mechanism of the noise cancelling device provides desired control over transmission loss and the range of frequencies attenuated, resulting in more effective and customizable noise reduction for varying operational environments and machinery types such as automobiles, and generators.

Figure 1B:
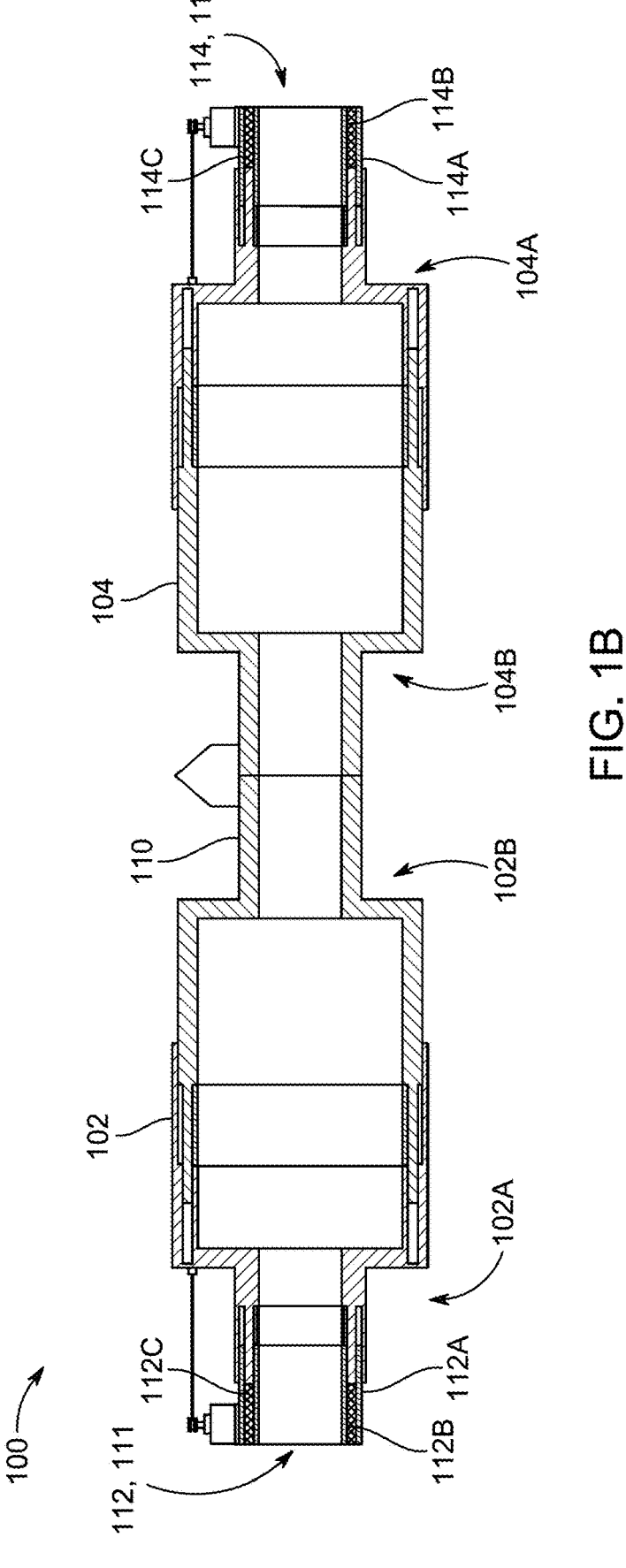
FIG. 1B is a cross-sectional side view of the noise cancelling device, according to certain embodiments.

Referring to FIG. 1A and FIG. 1B, cross-sectional views of a noise cancelling device 100 are illustrated, according to certain embodiments. The noise cancelling device 100 includes a first expansion chamber 102 and a second expansion chamber 104 fluid tightly coupled to each other via a connecting pipe 110. Each of the first and second expansion chambers 102, 104 has a cylindrical shape and defines a volume to receive a fluid medium, such as gas or air. The first and second expansion chambers 102, 104 are coaxially coupled with the connecting pipe 110 along a longitudinal axis 'A'. In one embodiment, the first and second expansion chambers 102, 104 are symmetrical in construction and dimensions. Specifically, the first and second expansion chambers 102, 104 are coaxially coupled with the connecting pipe 110 in such a way that a plane of symmetry 'P' is defined perpendicular to the longitudinal axis 'A' at a center point of the connecting pipe 110. In other words, a half portion of the noise cancelling device 100 defined by the first expansion chamber 102 along the plane of symmetry 'P' is identical to another half portion of the noise cancelling device 100 defined by the second expansion chamber 104. In some embodiments, the first and second expansion chambers 102, 104 may be asymmetrical in construction and dimension. The first and second expansion chambers 102, 104 are collectively referred to as 'the expansion chambers 101' and individually referred to as 'the expansion chamber 101' for the sake of brevity in explanation unless otherwise specifically mentioned.

The first expansion chamber 102 includes a first end 102A configured to couple with an inlet extension pipe 112 having a double wall. Specifically, the inlet extension pipe 112 includes an outer wall 112A and an inner wall 112B spaced apart from the outer wall 112A by a gap 112C. Similarly, the second expansion chamber 104 includes a first end 104A configured to couple with an outlet extension pipe 114 having a double wall. In particular, the outlet extension pipe 114 includes an outer wall 114A and an inner wall 114B spaced apart from the outer wall 114A by a gap 114C. The inlet and outlet extension pipes 112, 114 are collectively referred to as 'the extension pipes 111' and individually referred to as 'the extension pipe 111' for the sake of brevity in explanation unless otherwise specifically mentioned. The connecting pipe is connected to a second end 102B of the first expansion chamber 102 and a second end 104B of the second expansion chamber 104.

In some embodiments, the connecting pipe 110 may be integrally formed with the second ends 102B, 104B of the first and second expansion chambers 102, 104, respectively. As such, a free end of the connecting pipe of each of the first and second expansion chambers 102, 104 may be fluid tightly coupled to each other. In some embodiments, the connecting pipe 110 may be an individual component detachably attached to the second ends 102B, 104B of the first and second expansion chambers 102, 104, respectively. In such a case, the second ends 102B, 104B of the first and second expansion chambers 102, 104, respectively, may be provided with an opening to fluid tightly couple with the connecting pipe 110. Further, one end of the connecting pipe 110 may be coupled with the second end 102B of the first expansion chamber 102 and another end of the connecting pipe 110 may be coupled with the second end 104B of the second expansion chamber 104.

Figure 2A:
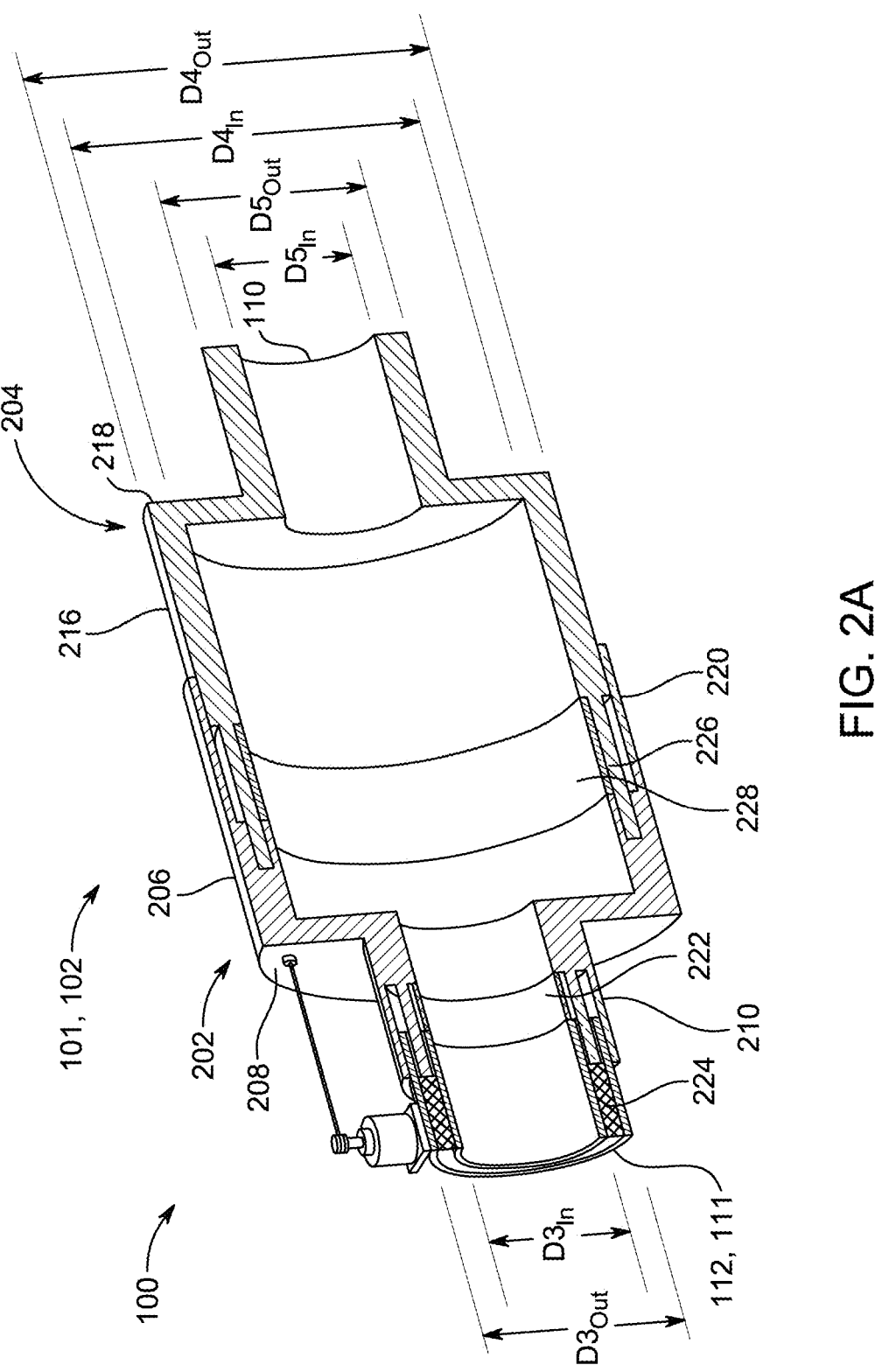
FIG. 2A is a cross-sectional perspective view of an expansion chamber of the noise cancelling device, according to certain embodiments.
Figure 2B:
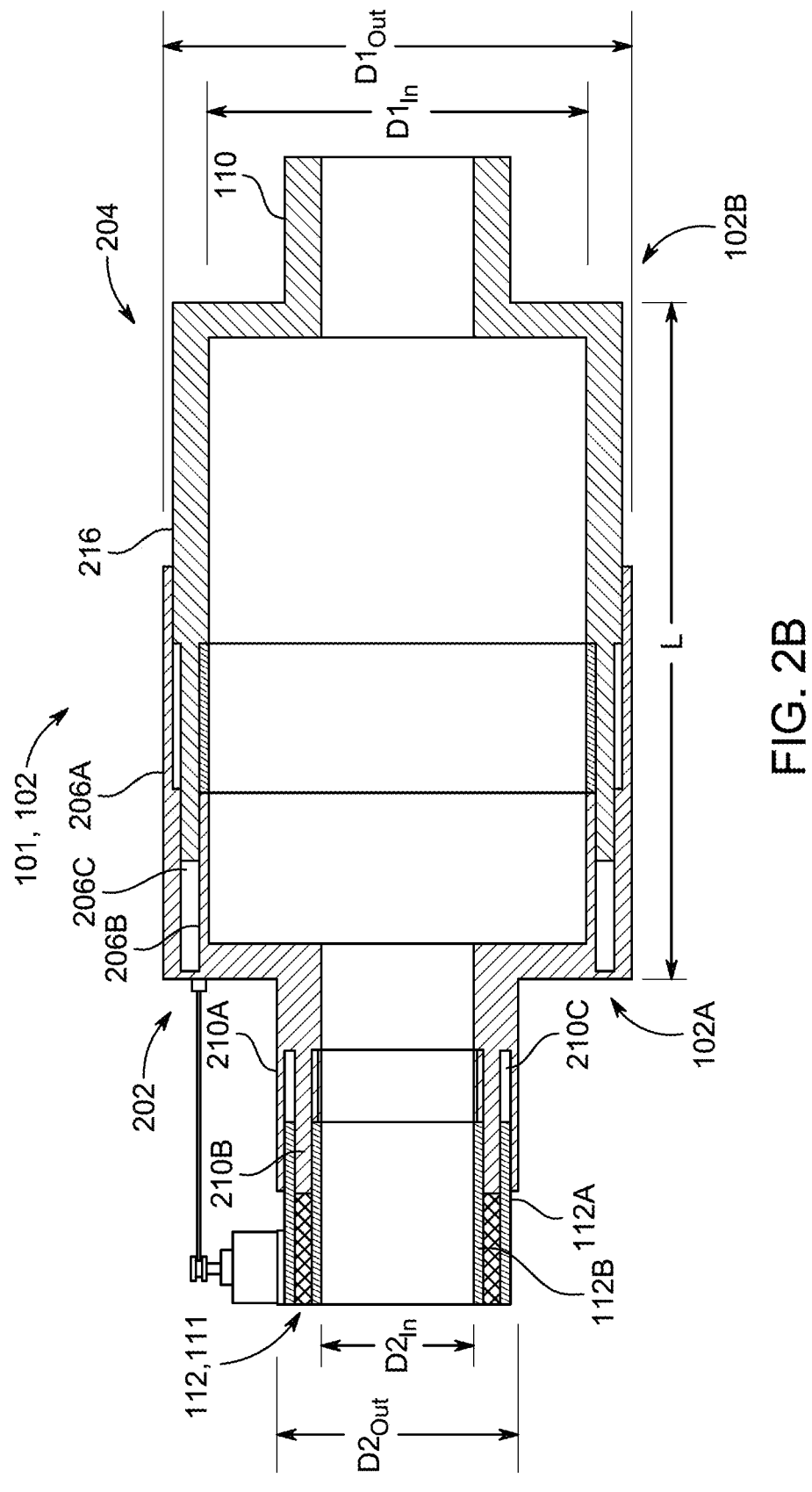
FIG. 2B is a cross-sectional side view of the expansion chamber of the noise cancelling device, according to certain embodiments.

Referring to FIG. 2A and FIG. 2B, cross-sectional views of the expansion chamber 101 of the noise cancelling device 100 are illustrated, according to certain embodiments. As the half portion of the noise cancelling device 100 defined by the first expansion chamber 102 is identical to the other half portion defined by the second expansion chamber 104 along the plane of symmetry 'P', the first expansion chamber 102 along with the inlet extension pipe 112 and the connecting pipe 110 is shown in FIG. 2A and FIG. 2B. The expansion chamber 101 has a hollow cylindrical shape including a first element 202 and a second element 204 slidably coupled to the first element 202. The first element 202 is configured to slidably engage with the second element 204 such that a length 'L' of the expansion chamber 101 defined by the first end 102A and the second end 102B may be varied based on the application of the noise cancelling device 100. The first element 202 includes a first cylindrical portion 206 defining a first diameter 'D1', a first circular base 208 connecting to the first cylindrical portion 206, and a second cylindrical portion 210 connecting to the first circular base 208. The first cylindrical portion 206 is configured to slidably couple with the second element 204 and the second cylindrical portion 210 is configured to slidably engage with the extension pipe 111. Specifically, the first cylindrical portion 206 includes a double wall having an outer wall 206A and an inner wall 206B spaced apart from the outer wall 206A by a gap 206C. As such, the second element 204 is slidingly engaged in the gap 206C of the double wall of the first element 202 to form a cylindrical body. The outer wall 206A of the expansion chamber 101 defines an outer diameter 'D1$_{out}$' and the inner wall 206B of the expansion chamber 101 defines an inner diameter, interchangeably referred to as the first diameter 'D1$_{in}$'.

According to the present disclosure, the first circular base 208 extends radially inward from the first cylindrical portion 206 and the second cylindrical portion 210 extends axially outward from the first circular base 208, as such the first element 202 is formed as an integral body. In some embodiments, the first cylindrical portion 206 and the first circular base 208 may be formed as an integral body and the second cylindrical portion 210 may be formed as an individual body detachably attached to the first circular base 208. In some embodiments, the first cylindrical portion 206, the first circular base 208, and the second cylindrical portion 210 may be formed as individual bodies and detachably coupled each other.

The second cylindrical portion 210 includes a double wall having an outer wall 210A and an inner wall 210B spaced apart from the outer wall 210A by a gap 210C. As such, the second cylindrical portion 210 of the first element 202 is slidingly engaged with the extension pipe 111. Particularly, the inner wall 210B of the second cylindrical portion 210 is disposed in the gap 112C of the double wall defined by the outer wall 112A and the inner wall 112B of the extension pipe 111. Consequently, the outer wall 112A of the inlet extension pipe 112 is slidingly received within the gap 210C of the double wall of the second cylindrical portion 210. The outer wall 210A of the second cylindrical portion 210 defines an outer diameter 'D2$_{out}$' and the inner wall 210B of the second cylindrical portion 210 defines an inner diameter 'D2$_{in}$', interchangeably referred to as the second diameter 'D2$_{in}$'. The inner wall 112B of the inlet extension pipe 112 defines an inner diameter 'D3$_{in}$' which is equal to the first diameter 'D2$_{in}$' of the second cylindrical portion 210 and the outer wall 112A of the inlet extension pipe 112 defines an outer diameter 'D3$_{out}$' which is less than or equal to the outer diameter 'D2$_{out}$' of the second cylindrical portion 210. The expansion chamber 101 further includes a lining member 222 present between an inner contacting surface of the second cylindrical portion 210 of the first element 202 and the inlet extension pipe 112 to form an interior surface having a single diameter, that is the second diameter 'D2$_{in}$', when the lining member 222 is in a resting state. The resting state of the lining member 222 may be defined as a state at which the inlet extension pipe 112 is engaged with the second cylindrical portion 210 of the first element 202 at a default position, otherwise known as a non-actuated position, or an original position, of the noise cancelling device 100.

According to the present disclosure, the extension pipe 111 is slidingly engaged with the second cylindrical portion 210 of the first element 202 such that the first element 202 may move between the default position and an actuated position. At the actuated position of the noise cancelling device 100, the length 'L' of the expansion chamber 101 may vary by a distance defined by the first element 202 between the default position and the actuated position thereof. Actuation of the noise cancelling device 100 will be described in detail with respect to the subsequent figures. The extension pipe 111 further includes a plurality of springs 224 configured to return the first element 202 of the expansion chamber 101 at the default position. In an embodiment, the spring 224 may be a compression spring disposed between the outer wall 112A and the inner wall 112B of the extension pipe 111.

As such, the inner wall 210B of the second cylindrical portion 210 may rest against a biasing force of the spring 224 between the outer wall 112A and the inner wall 112B of the extension pipe 111. During an actuation of the noise cancelling device 100, the first element 202 may move from the default position to the actuated position against the biasing force of the spring 224. Upon deactivation of the noise cancelling device 100, the biasing force of the spring 224 may cause the first element 202 to return to the default position.

The second cylindrical portion 210 is attached to the first circular base 208 in such a way that the second cylindrical portion 210 is axially aligned with the first cylindrical portion 206 along the longitudinal axis 'A' of the noise cancelling device 100. Further, the first diameter 'D1$_{in}$' defined by the inner wall 206B of the first cylindrical portion 206 is larger than the second diameter 'D2$_{in}$' defined by the inner wall 210B of the second cylindrical portion 210. Moreover, the inner diameter 'D3$_{in}$' defined by the inner wall 112B of the inlet extension pipe 112 is smaller than the first diameter 'D1$_{in}$' defined by the inner wall 206B of the first cylindrical portion 206 and equal to the second diameter 'D2$_{in}$' defined by the inner wall 210B of the second cylindrical portion 210.

The second element 204 of the expansion chamber 101 further includes a third cylindrical portion 216 having a third diameter 'D4$_{in}$' configured to slidingly engage with the first cylindrical portion 206 of the first element 202. Specifically, the third cylindrical portion 216 includes an extending inner lip 226 configured to be received within the gap 206C defined by the outer wall 206A and the inner wall 206B of the first cylindrical portion 206. Further, an extending outer lip 220 of the first cylindrical portion 206 is configured to slidingly engage with the third cylindrical portion 216. As such, the extending inner lip 226 and the extending outer lip 220 of the second and first elements 204, 202, respectively, are together configured to slidingly engage each other to define the cylindrical body, and thereby the first element 202 of the expansion chamber 101 is configured to move between the default position and the actuated position relative to the second element 204. The second element 204 further includes a second circular base 218 connected to the third cylindrical portion 216 and the connecting pipe 110.

According to the present disclosure, the second circular base 218 extends radially inward from the third cylindrical portion 216 and the connecting pipe 110 extends axially outward from the second circular base 218, as such the second element 204 is formed as an integral body. In some embodiments, the third cylindrical portion 216 and the second circular base 218 may be formed as an integral body and the connecting pipe 110 may be formed as an individual body and detachably attached to the second circular base 218. In some embodiments, the third cylindrical portion 216, the second circular base 218, and the connecting pipe 110 may be formed as individual bodies and detachably coupled each other.

The expansion chamber 101 further includes an elastomeric lining 228 present between an inner contacting surface of the first element 202 and the second element 204. Specifically, the elastomeric lining 228 is disposed on an inner surface of the extending inner lip 226 to form an interior surface having a single diameter, that is the third diameter 'D4$_{in}$', when the elastomeric lining 228 is in the resting state.

The connecting pipe 110 has an inner diameter 'D5$_{in}$' equal to the inner diameter 'D3$_{in}$' defined by the inner wall 112B of each extension pipe 111. Further, the inner diameter 'D5$_{in}$' of the connecting pipe 110 is same as the inner diameter, or the second diameter 'D2$_{in}$', of the second cylindrical portion 210 of the first element 202. The connecting pipe 110 further includes an outer diameter 'D5$_{out}$' equal to the outer diameter 'D2$_{out}$' defined by the outer wall 210A of the second cylindrical portion 210. Further, the inner diameter 'D5$_{in}$' of the connecting pipe 110 is smaller than the inner diameter, or the first diameter 'D1in', of the first cylindrical portion 206 of the first element 202 and the inner diameter, or the third diameter 'D4$_{in}$', of the third cylindrical portion 216 of the second element 204. As such, the first expansion chamber 102, the connecting pipe 110, and the inlet extension pipe 112 are coaxially aligned along the longitudinal axis 'A'. In other words, the first expansion chamber 102, the connecting pipe 110, and the inlet extension pipe 112 are coaxially aligned along the longitudinal axis 'A' of the first, second and third cylindrical portions 206, 210, 216.

In an embodiment, the connecting pipe 110 is a fix-length pipe. The fix-length pipe may be defined as a pipe having a solid fixed structure with a fixed length. In some embodiments, the connecting pipe 110 may be made of multiple elements movably coupled to each other such that a length thereof may be adjusted based on the application of the noise cancelling device 100. In an embodiment, at the default position of the first element 202, the length 'L' of each of the first and second expansion chambers 102, 104 is same as the length of the connecting pipe 110. During an actuated condition of the noise cancelling device 100, the length of the connecting pipe 110 may remain same whereas the length 'L' of each of the first and second expansion chambers 102, 104 may vary. Specifically, the first and second expansion chambers 102, 104 are configured to be extended or retracted by adjusting the length 'L' thereof during the actuated condition.

According to the present disclosure, the expansion chambers 101, the connecting pipe 110, and the extension pipes 111 form a unitary body. Further, the expansion chambers 101, the connecting pipe 110, and the extension pipes 111 are axially aligned along the longitudinal axis 'A' of all the cylindrical portions, such as the first, second, and third cylindrical portions 206, 210, 216, in the order of the inlet extension pipe 112, the first expansion chamber 102, the connecting pipe 110, the second expansion chamber 104, and the outlet extension pipe 114.

Figure 3:
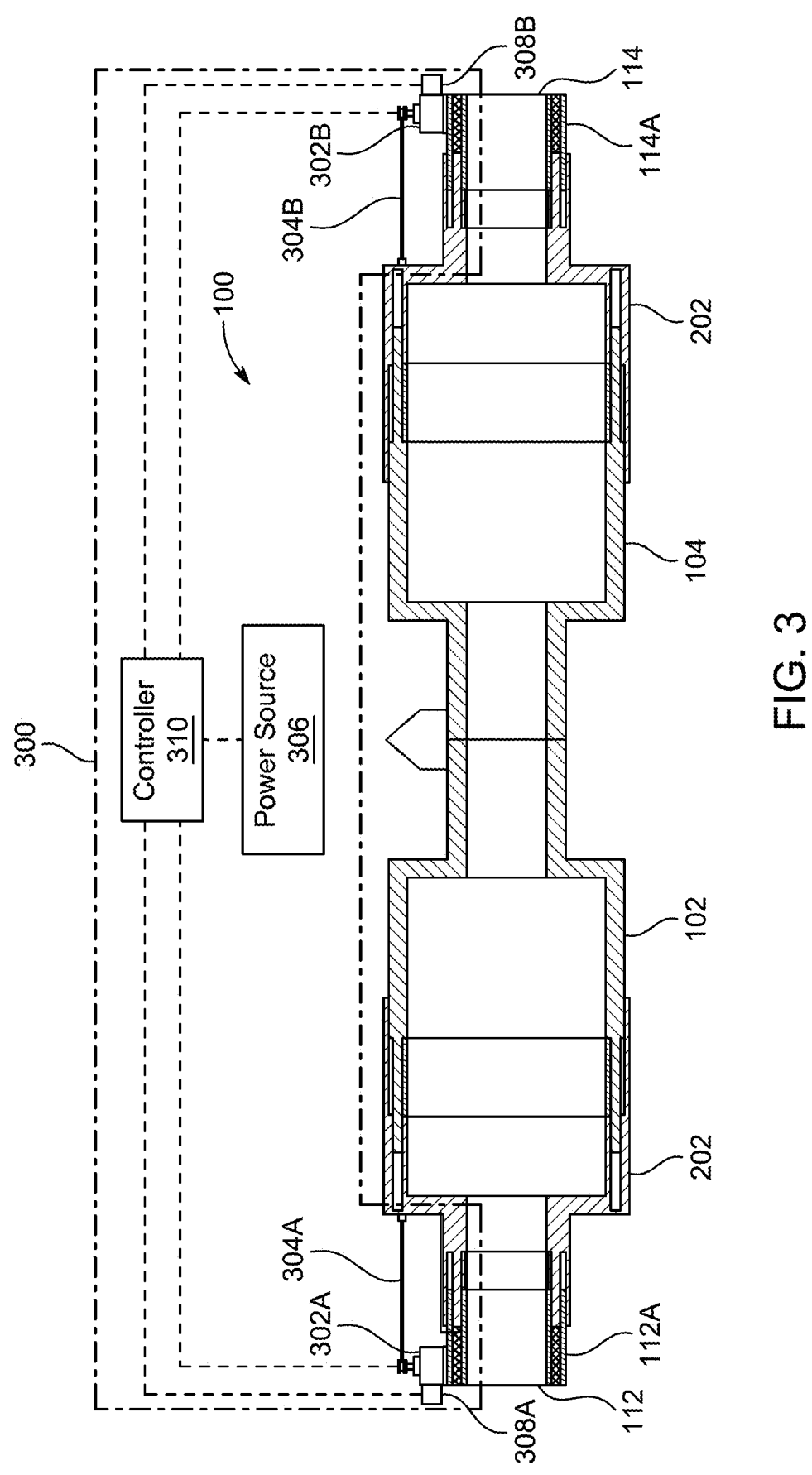
FIG. 3 illustrates a control system associated with the noise cancelling device, according to certain embodiments.

Referring to FIG. 3, a schematic diagram of a control system 300 associated with the noise cancelling device 100 is illustrated, according to certain embodiments. The control system 300 is configured to actuate the first element 202 of each of the first and second expansion chambers 102, 104 to move between the default position and the actuated position thereof. As such, the control system 300 is configured to actuate a size of the expansion chambers 101 by adjusting the length 'L' thereof.

The control system 300 includes a first actuator 302A mounted on the outer wall 112A of the inlet extension pipe 112 and a second actuator 302B mounted on the outer wall 114A of the outlet extension pipe 114. Further, the first actuator 302A is connected to the first circular base 208 of the first element 202 via a first cable 304A and the second actuator 302B is connected to the second circular base 218 of the second element 204 via a second cable 304B. The first actuator 302A and the second actuator 302B are collectively referred to as 'the actuators 302' and individually referred to as 'the actuator 302' unless otherwise specifically mentioned. Similarly, the first cable 304A and the second cable 304B are collectively referred to as 'the cables 304' and individually referred to as 'the cable 304' unless otherwise specifically mentioned.

In an embodiment, the actuator 302 may be a rotary actuator having an output shaft to produce a rotary power. One end of the cable 304 may be attached to the output shaft of the actuator 302 and another end of the cable 304 may be attached to the circular base 208 of the expansion chamber 101. The actuator 302 may be further communicated with a power source 306 to receive a desired power therefrom to produce the rotary power to actuate the first element 202 of the expansion chamber 101. In some embodiments, the actuator 302 may be a linear actuator having one operating end fixedly attached to each of the outer walls 112A, 114A of the extension pipes 111 and another operating end coupled with the first element 202 of the expansion chambers 101 to adjust the length 'L' thereof. In an embodiment, the power source 306 may be a commercial power supply line or a battery.

The control system 300 further includes a first sensor 308A disposed on the first actuator 302A and a second sensor 308B disposed on the second actuator 302B. The first sensor 308A and the second sensor 308B are configured to detect positions such as the default position or the actuated position of the first element 202 of the expansion chambers 101. The first sensor 308A and the second sensor 308B are collectively referred to as 'the sensors 308' and individually referred to as 'the sensor 308' unless otherwise specifically mentioned. In an embodiment, the sensor 308 may be in two way communication with the actuator 302 to receive an input signal indicative of the size of the expansion chamber 101 and to provide an output signal indicative of an actuation command to the actuator 302.

The control system 300 further includes a controller 310 configured to be in electric communication with the sensors 308 to receive the input signals indicative of the size of the expansion chambers 101 and to provide the output signal indicative of the actuation command to the actuators 302. Further, the controller 310 includes a circuitry configured to receive and process data from the sensors 308 and give commands to the actuators 302. The controller 310 is configured to adjust the size of the expansion chambers 101 on real-time, such that the expansion chambers 101 are capable of adjusting their lengths 'L' in real-time. The data from the sensors 308 refers to the input signal indicative of the size of the expansion chamber 101 in real-time and commands to the actuator 302 refers to the output signal indicative of the actuation commands. In an embodiment, the controller 310 receives the data from the sensor 308 either through a cable or a wireless transmission and gives commands to the actuator 302 through a cable or a wireless transmission. In one embodiment, the controller 310 may be communicated with the sensors 308 using a wired connection. In such a case, the control system 300 having the controller 310 may be positioned proximal to the noise cancelling device 100 to allow the controller 310 to desirably communicate with the sensor 308 without undesired transmission loss. In another embodiment, the controller 310 may be communicated with the sensor 308 using a wireless connection such as a Bluetooth or a WiFi connection. In such a case, the control system 300 having the controller 310 may be positioned at a remote distance from the noise cancelling device 100 as desired by an operational efficiency thereof. Upon receiving the commands from the sensors 308, the actuators 302 is configured to execute the commands from the controller 310 to adjust the length 'L' of each expansion chamber 101. Based on the command signal from the controller 310, the actuators 302 may be operated to generate the rotary power, which in turn pull the cables 304 to move the first element 202 to the actuated position and thereby increase the length 'L' of the expansion chambers 101. Upon removing the command signal, the first element 202 may move to the default position to adjust the length 'L' of the expansion chambers 101. Simultaneously, the actuator 302 is configured to detect the length 'L' of the expansion chambers 101 based on the input signal from the sensors 308.

According to the present disclosure, the noise cancelling device 100 is implemented in the exhaust system for a range of noisy machineries, including but not limited to, automobiles, trucks, and generators. The expansion chambers 101 of the noise cancelling device 100 may be dynamically adjusted to improve noise attenuation. Based on acoustic feedback, the length 'L' of the expansion chambers 101 may be adjusted in real time to perform desired noise attenuation.

In an embodiment, the noise cancelling device 100 utilizes a signal processing technique such as the chirp function. The chirp function, as utilized herein, refers to a time-varying signal in which the instantaneous frequency increases or decreases in a continuous or discrete manner over a defined interval. According to the present disclosure, the controller 310 is configured to give commands based on a chirp function's feedback. In response to feedback derived from the chirp signal such as frequency response data, resonance behavior, or phase shift characteristics, the controller 310 is configured to selectively modify the length 'L' or volume of the expansion chambers 101. Such structural reconfiguration may be executed in a linear, exponential, or stepwise manner, depending on the modulation profile of the chirp signal. The resulting geometric transformation enables the noise cancelling device 100 to tune its resonant frequency in real time, thereby enhancing its ability to attenuate a broader or dynamically shifting range of acoustic frequencies. In some embodiments, the chirp-based feedback loop may be implemented in a closed-loop control system, wherein the acoustic output of the noise cancelling device 100 is continuously monitored and used to refine the dimensions of the expansion chambers 101 for optimal noise suppression.

Figure 4:
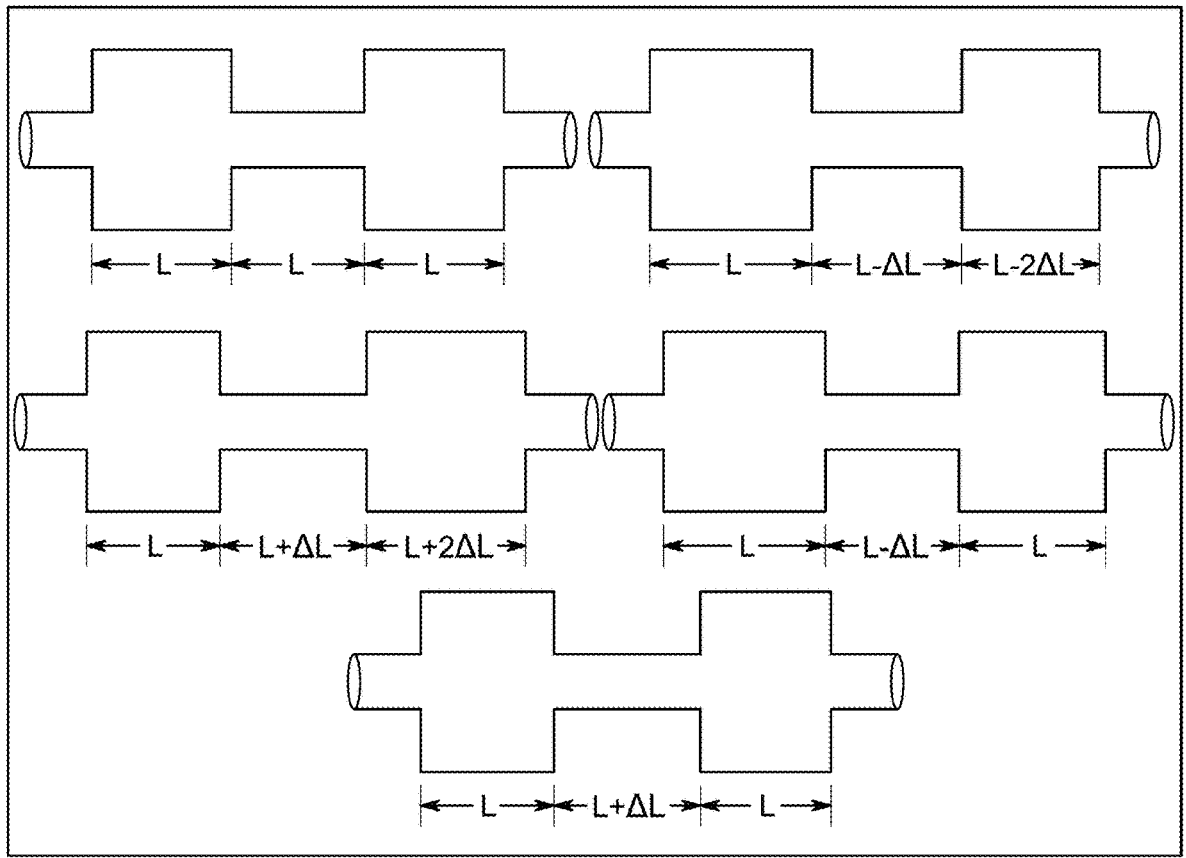
FIG. 4 shows various scenarios of the expansion chamber of the noise cancelling device based on chirp function feedback, according to certain embodiments.

According to the present disclosure, the noise cancelling device 100 is an adaptive or an automated mechatronic silencer, capable of attenuating acoustic noise by adjusting transmission loss value and noise frequency stopband thereof. In an implementation, the noise cancelling device 100 is configured to provide real-time control over acoustic performance parameters, including but not limited to transmission loss (TL) and spectral positioning of the noise attenuation stopband. In an embodiment, the expansion chambers 101 of the noise cancelling device 100 may be modulated in response to a time-varying control signal, such as the chirp function. The chirp function is employed as a diagnostic or feedback signal to probe the acoustic response across a range of frequencies. Based on the response to the chirp excitation, such as resonance peaks, phase shifts, or amplitude attenuation, the controller 310 is configured to dynamically adjust the length 'L' of the expansion chambers 101. This modulation enables the noise cancelling device 100 to shift a location of the stopband within the frequency spectrum, either towards lower frequencies (left of the center frequency) or higher frequencies (right of the center frequency), thereby aligning the attenuation band with the dominant spectral components of the incident noise. Various operational scenarios of the noise cancelling device 100, facilitated by the chirp function, are shown in FIG. 4 which illustrates dynamic response thereof to different acoustic environments.

In an embodiment, the noise cancelling device 100 has the stopband location either to the left or right of the center frequency within a frequency spectrum of 0 to 5000 Hz. Such spectral agility ensures that the noise cancelling device 100 maintains optimal noise suppression performance under varying operational conditions, such as changes in engine speed, load, or environmental acoustics, when used with the exhaust system of an engine. In some embodiments, the control system 300 may include electromechanical actuators, shape-memory alloys, or fluid-control elements capable of reconfiguring the length 'L' of the expansion chambers 101 in a continuous or stepwise manner. The integration of chirp-based feedback with structural adaptability allows the noise cancelling device 100 to function as a self-tuning silencer, capable of maintaining high transmission loss across dynamically shifting noise profiles.

The noise cancelling device 100 may be integrated with various systems where fluid or air flow generates undesired acoustic emissions. In exhaust and car muffler systems, the noise cancelling device 100 reduces engine noise by attenuating pressure waves. In air handling systems and ducted pumps, fan and flow-induced noise is minimized. For air discharge lines and compressors, it suppresses pulsation and high-frequency noise, enhancing acoustic comfort and system efficiency. The adaptive design of the noise cancelling device 100 allows real-time tuning to match specific noise profile of each application.

Figure 5A:
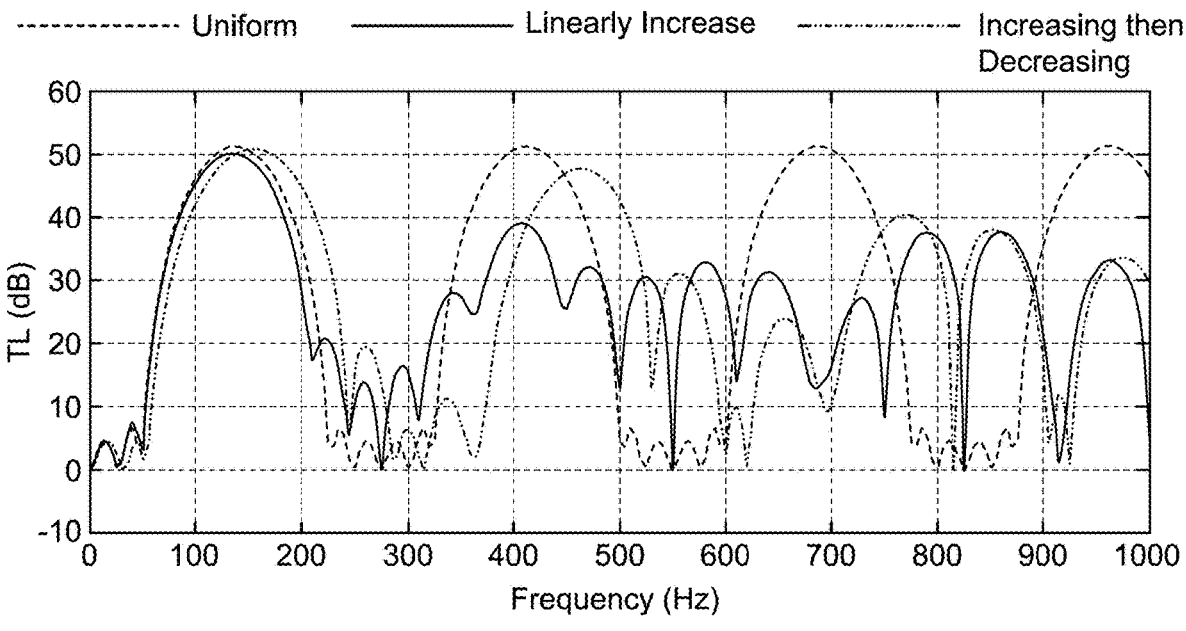
FIG. 5A is a graphical representation showing an effect of various schematic scenarios on transmission loss and stopband frequency of the noise cancelling device, according to certain embodiments.

According to the present disclosure, the length 'L' of the expansion chambers 101 of the noise cancelling device 100 is adjusted to modify acoustic response thereof in real time and thereby to match the spectral characteristics of incident noise. Such dynamic tuning allows the noise cancelling device 100 to optimize transmission loss (TL) and reposition the stopband within the frequency spectrum. FIG. 5A illustrates the acoustic performance of the noise cancelling device 100 under three distinct chamber configurations including Uniform, Linearly Increasing, and Increasing then Decreasing, each producing a unique transmission loss profile across a frequency range of 0 Hz to 1000 Hz. This result demonstrates that the noise cancelling device 100 may be configured to suppress a broad range of noise frequencies and intensities, thereby enhancing its applicability across various fluid and air-based systems, including exhaust assemblies, air handling units, and compressors.

Figure 5B:
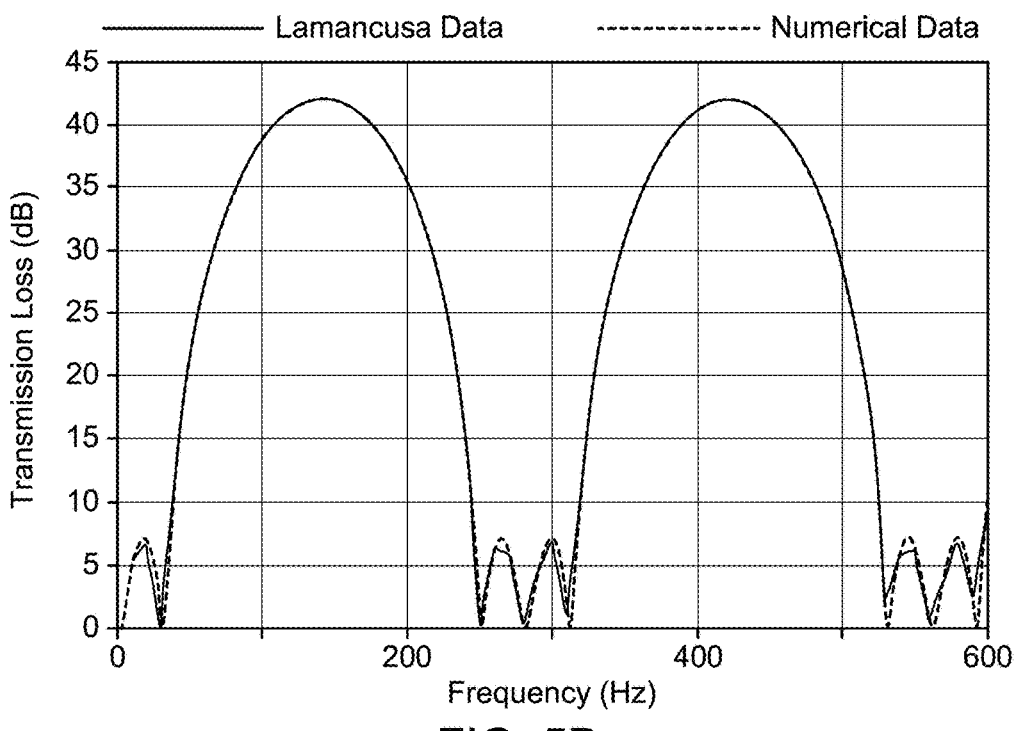
FIG. 5B is a graphical representation showing transmission loss validation of the noise cancelling device, according to certain embodiments.

Performance of the noise cancelling device 100 of the present disclosure is validated through comparison with established acoustic models. Specifically, the transmission loss characteristics of the noise cancelling device 100 were evaluated against a study by Lamancusa [J. Lamancusa, "The transmission loss of double expansion chamber mufflers with unequal size chambers" Applied Acoustics, 1988, 24(1), 15-32, incorporated herein by reference in its entirety], under geometrically equivalent conditions. As illustrated in FIG. 5B, the comparative analysis confirms that a theoretical model underlying the present disclosure accurately predicts acoustic attenuation behavior. This validation supports the practical effectiveness of the noise cancelling device 100 and demonstrates its reliability in real-world noise control applications. The mathematical model used in the present disclosure includes the transmission loss defined as:

$$TL = 20\,Log_{10}(\tau)$$

where $\tau = T_1/T_n$, and $T_1$ is the pressure amplitude of the acoustic wave incident expansion chambers and $T_n$ is the pressure amplitude of the transmitted acoustic wave exiting expansion chambers.

According to the present disclosure, the transmission loss in the noise cancelling device 100 follows a mathematical description as:

$$TL_{double\ chamber} =$$

$$20Log_{10}\left[\left(\frac{(m+1)^2}{4m}e^{ikL_1} + \frac{(1-m)(m-1)}{4m}e^{-ikL_1}\right)\left(\frac{(1+n)^2}{4n}e^{ik(L_2+L_3)} + \right.\right.$$

$$\left.\frac{(1-n)(n-1)}{4n}e^{ik(L_2-L_3)}\right) + \left(\frac{(1+m)(m-1)}{4m}e^{ikL_1} + \frac{(1-m)(m+1)}{4m}e^{-ikL_1}\right)$$

$$\left.\left(\frac{(1-n)(n+1)}{4n}e^{ik(L_3-L_2)} + \frac{(1+n)(n-1)}{4n}e^{-ik(L_2+L_3)}\right)\right]$$

wherein i is the standard imaginary unit (defined as square root of −1), m represents an area ratio between the first expansion chamber 102 and the connecting pipe 110, n represents an area ratio between the second expansion chamber 104 and the connecting pipe 110, L1 represents the length of the first expansion chamber 102, L2 represents the length of the connecting pipe 110, and L3 represents the length of the second expansion chamber 104.

Figure 6:
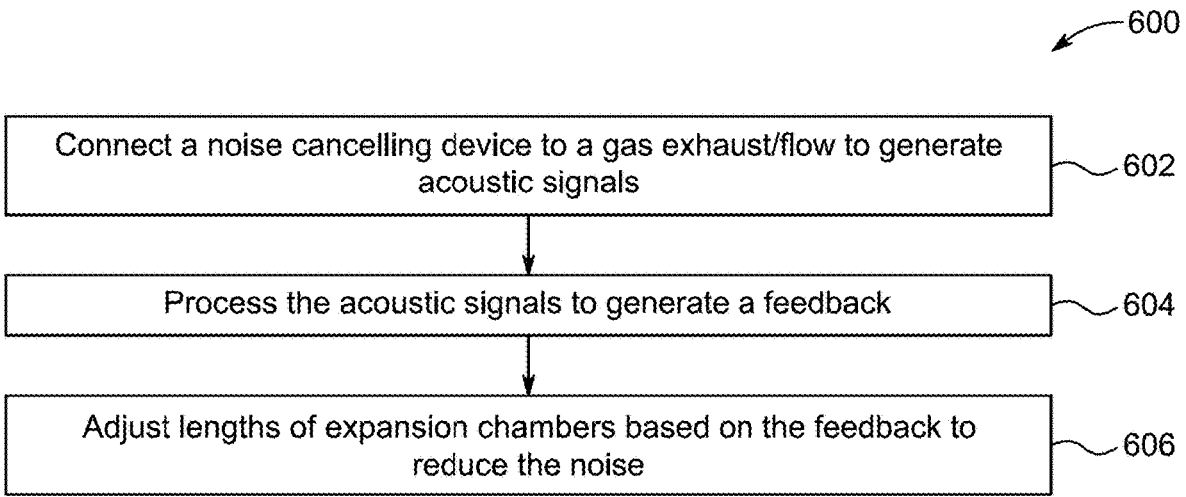
FIG. 6 is a schematic flowchart of a method of noise reduction on a system providing a flow of gas using the noise cancelling device, according to certain embodiments.

Referring to FIG. 6, a schematic flow chart representing a method 600 of noise reduction on a system providing a flow of gas using the noise cancelling device 100 is illustrated, according to certain embodiments. The system providing the flow of gas is selected from the group consisting of exhaust system, car muffler system, air handling system, ducted pumps, air discharge line, and compressors. The sequence of steps shown is exemplary and not intended to limit the scope of the method 600. The steps may be performed in any suitable order, and certain steps may be combined, omitted, or substituted without departing from the principles of the disclosed method 600.

At step 602, the method 600 includes connecting the noise cancelling device 100 to a gas exhaust/flow to generate acoustic signals. The method 600 includes operatively coupling the noise cancelling device 100 to the gas exhaust or flow conduit of the system such that the noise cancelling device 100 is positioned to receive and interact with the pressure waves generated by the movement of the gaseous medium. The noise cancelling device 100 may be coupled to the system via a fluid-tight interface, flange, or coupling mechanism that ensures uninterrupted transmission of acoustic energy from an exhaust stream of the system into the expansion chambers 101. Upon exposure to the gas flow, the noise cancelling device 100 is configured to receive acoustic signals inherently produced by turbulence, pulsation, or mechanical excitation within the system. These acoustic signals serve as input stimuli for the adaptive silencing mechanism, initiating real-time feedback processing and structural adjustment of the expansion chambers 101. The dynamic interaction between the incoming gas flow and the internal geometry of the noise cancelling device 100 enables modulation of transmission loss and frequency-specific attenuation, thereby facilitating effective noise suppression across a range of operating conditions.

At step 604, the method 600 includes processing the acoustic signals to generate the feedback. The method 600 includes receiving acoustic signals generated by the interaction of the gaseous medium with the internal geometry of the noise cancelling device 100. The signals, including pressure fluctuations, frequency components, and amplitude variations, may be captured by the sensors 308 positioned adjacent the expansion chambers 101. The captured signals may be transmitted to a signal processing module of the controller 310 to analyze the spectral content of the acoustic input in real time. The processing may involve frequency decomposition, amplitude thresholding, and phase analysis to identify dominant noise components and resonance conditions. Based on the processed data, the controller 310 may generate feedback data indicative of the current acoustic environment.

At step 606, the method 600 includes adjusting the lengths 'L' of the expansion chambers 101 based on the feedback to reduce the noise. The feedback generated by the controller 310 may be further used to determine the optimal configuration of the expansion chambers 101, specifically, the desired adjustment in the length 'L' of the expansion chambers 101. The feedback signal is relayed to the controller 310, which may actuate the actuators 302. The actuators 302 may move the first elements 202 of the expansion chambers 101 to adjust the length 'L' thereof to achieve desired attenuation of identified noise frequencies.

According to the present disclosure, the noise cancelling device 100 includes a mechanically adaptive mechanism, which includes two expansion chambers 101 fluidly coupled via the connecting pipe 110, such as a fixed-length conduit. Each expansion chamber 101 allows dynamic adjustment of its axial length, thereby enabling real-time tuning of acoustic attenuation characteristics. The length adjustment is controlled by the control system 300, which may be integrated within a cockpit or control interface of the system. This control system 300 is operatively configured to receive acoustic feedback and autonomously actuate the expansion chambers 101 to modify their internal geometry in response to detected noise conditions. The expansion chamber 101 includes a dual-segment structure having the second element 204 such as a static outer housing and the first element 202 such as a movable inner segment. The inner segment is mechanically driven by the actuators 302 such as a motor-pulley assembly, which actuates a cable system including the cables 304 to extend or retract the length 'L' of the expansion chambers 101 based on directional control signals. The movement of the inner segment is guided by precision slots and sliding end elements to ensure linear displacement and structural stability. The return mechanism including the plurality of springs 224 is provided to restore the inner segment to its default position, while the elastomeric lining 228 ensures a continuous and acoustically smooth internal surface. To facilitate accurate control and feedback integration, the position of the first element 202 of the expansion chambers 101 is continuously monitored by one or more sensors 308 such as the position sensors operatively coupled to the actuators 302. The sensors 308 provide real-time positional data to the control system 300, enabling precise modulation of geometry of the expansion chambers 101 in accordance with the acoustic requirements of the operating environment.

In the present disclosure, operational efficiency of the noise cancelling device 100 is analyzed in comparison with traditional car mufflers, which represent the conventional approach to automotive noise reduction. The proof of concept is established by conducting a series of simulations that compare the transmission loss, a key metric for assessing the efficacy of noise reduction technologies, between the traditional fixed-length muffler and the adaptive mechanism of the noise cancelling device 100 under various operational scenarios. These scenarios are designed to test the ability of the adaptive expansion chambers to adjust their lengths dynamically, thereby targeting and attenuating different noise frequencies more effectively than static systems.

Three distinct noise cancelling model scenarios have been simulated to illustrate how the adaptive chamber lengths can be finely tuned to filter specific frequency ranges:

Low-Frequency Targeting: In this scenario, the adaptive mechanism is configured to maximize attenuation in the lower frequency range, which is typically challenging for fixed mufflers.

Mid-Frequency Adaptation: This test demonstrates the mechanism's capability to adjust to mid-range frequencies, which are common in everyday driving conditions.

High-Frequency Attenuation: The third scenario highlights the system's effectiveness in reducing noise at higher frequencies, where traditional mufflers often perform inadequately.

In the present disclosure, operational efficiency of the "Adaptive Noise-Cancelling/Silencing Mechatronic Mechanism", specifically applied to automotive muffler systems is substantiated through rigorous numerical simulations. The noise cancelling device 100 dynamically adjusts the lengths 'L' of the expansion chambers 101 in response to varying acoustic signals, promises a significant enhancement in noise reduction capabilities over conventional fixed muffler systems. The adaptive nature of the mechanism allows it to effectively target a wider range of frequencies, revolutionizing the approach to acoustic silencing in various industrial applications.

Automobile exhaust systems are important for noise control technologies due to both environmental regulations and consumer demand for quieter vehicles. Traditional mufflers utilize fixed geometries that are generally optimized for a specific range of frequencies, often failing to provide adequate attenuation across the broader spectrum of road and engine noises encountered in real-world scenarios. The adaptive mechanism of the present disclosure addresses this limitation by incorporating feedback-driven adjustments to the muffler's internal chamber lengths, thus tailoring its acoustic properties in real time to the changing noise environment.

Figure 7A:
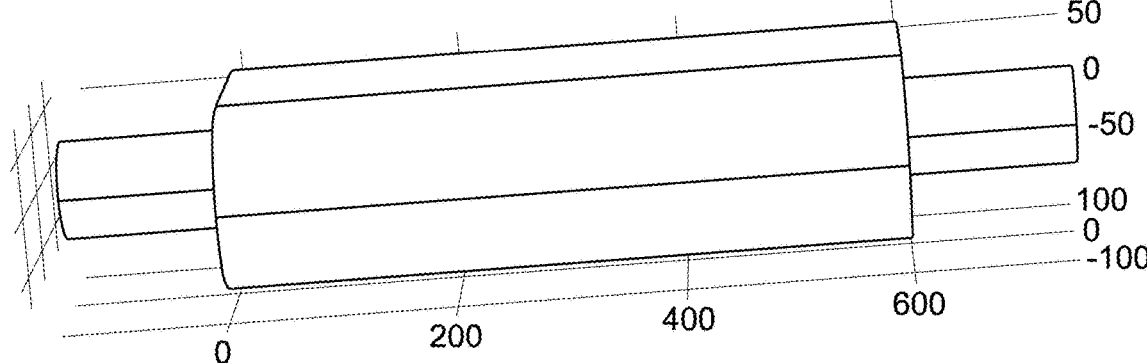
FIG. 7A shows a three dimensional (3D) model of a traditional muffler having a conventional cylindrical silencer structure comprising an inlet and outlet pipes.
Figure 7B:
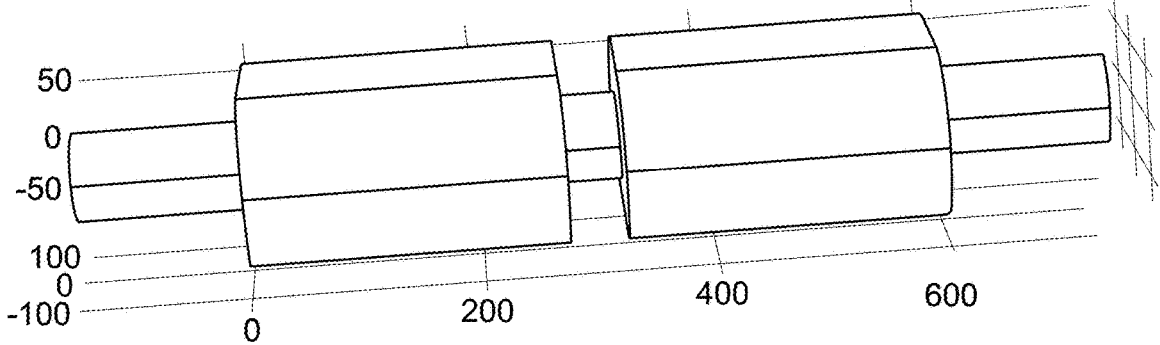
FIG. 7B shows a 3D model of a first design concept having a dual-cylinder design connected by a reduced-diameter pipe, according to certain embodiments.
Figure 7C:
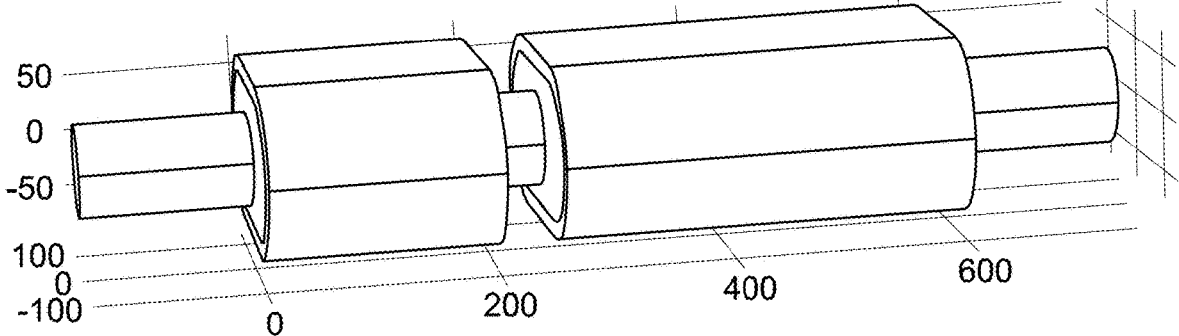
FIG. 7C shows a 3D model of a second design concept having two cylindrical chambers connected via an offset pipe, according to certain embodiments.
Figure 7D:
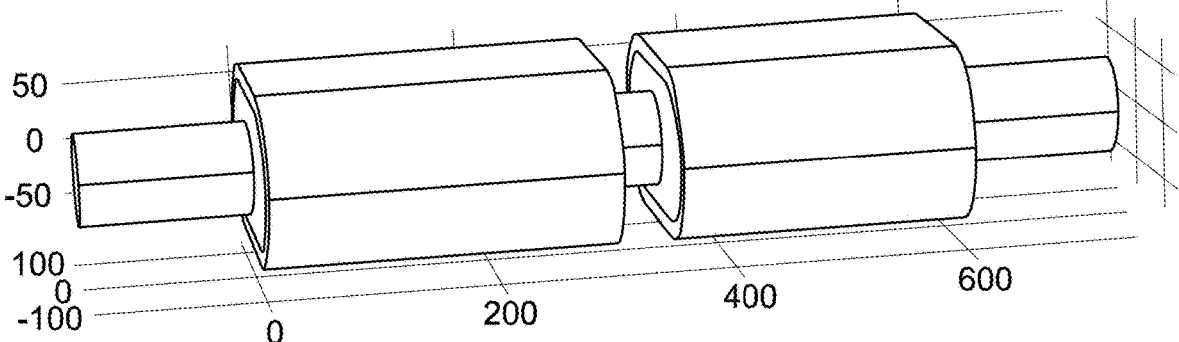
FIG. 7D shows a 3D model of a third design concept having a conical transition section between two chambers, according to certain embodiments.
Figure 8A:
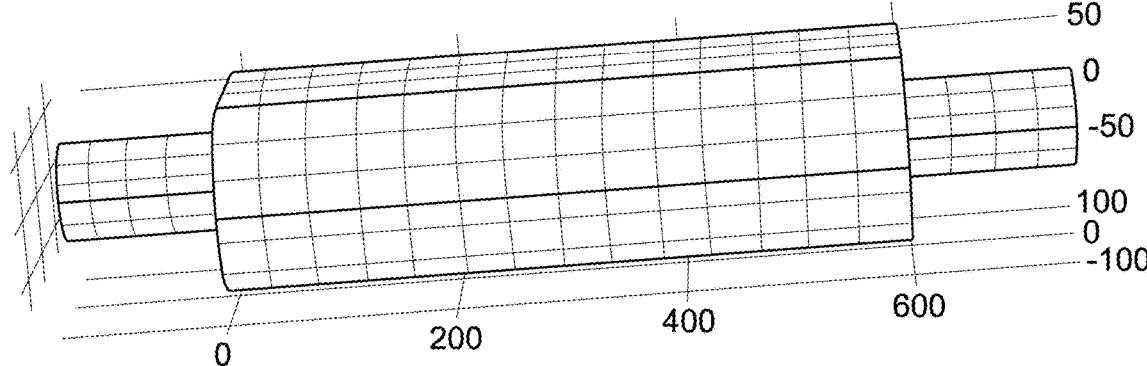
FIG. 8A shows a meshed configuration of the traditional muffler of FIG. 7A.
Figure 8B:
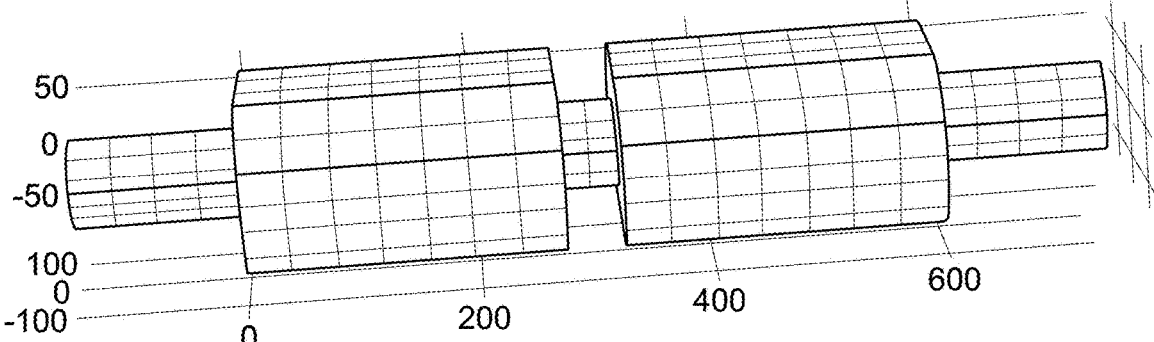
FIG. 8B shows a meshed configuration of the first design concept of FIG. 7B, according to certain embodiments.
Figure 8C:
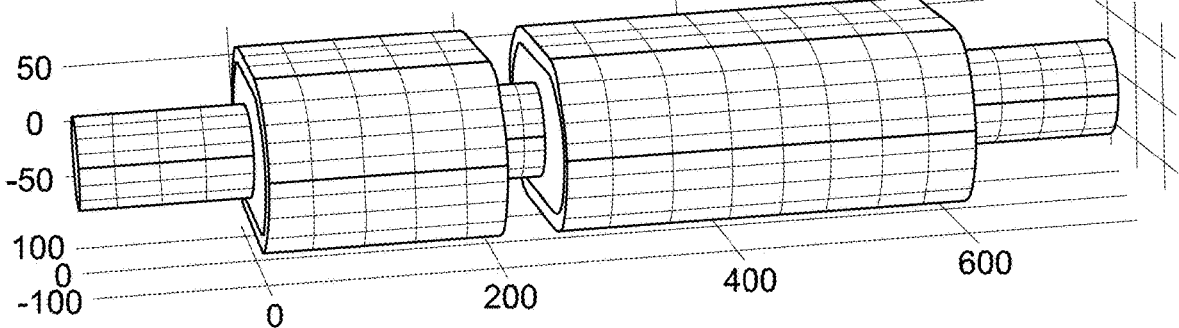
FIG. 8C shows a meshed configuration of the second design concept of FIG. 7C, according to certain embodiments.
Figure 8D:
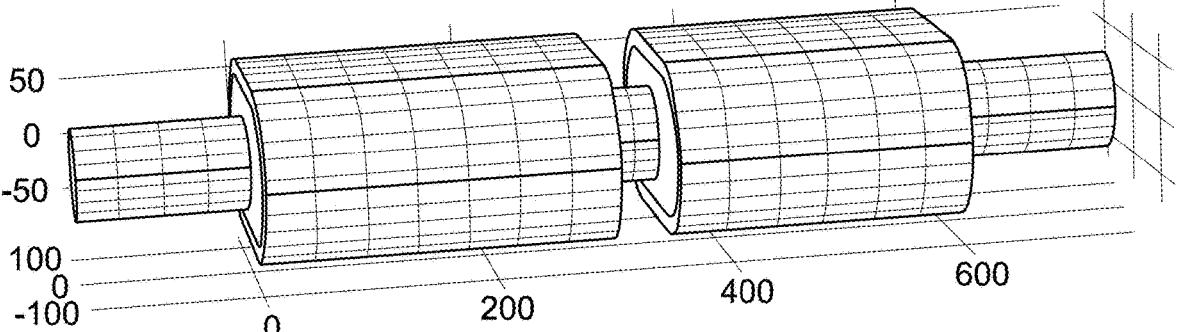
FIG. 8D shows a meshed configuration of the third design concept of FIG. 7D, according to certain embodiments.
Figure 9A:
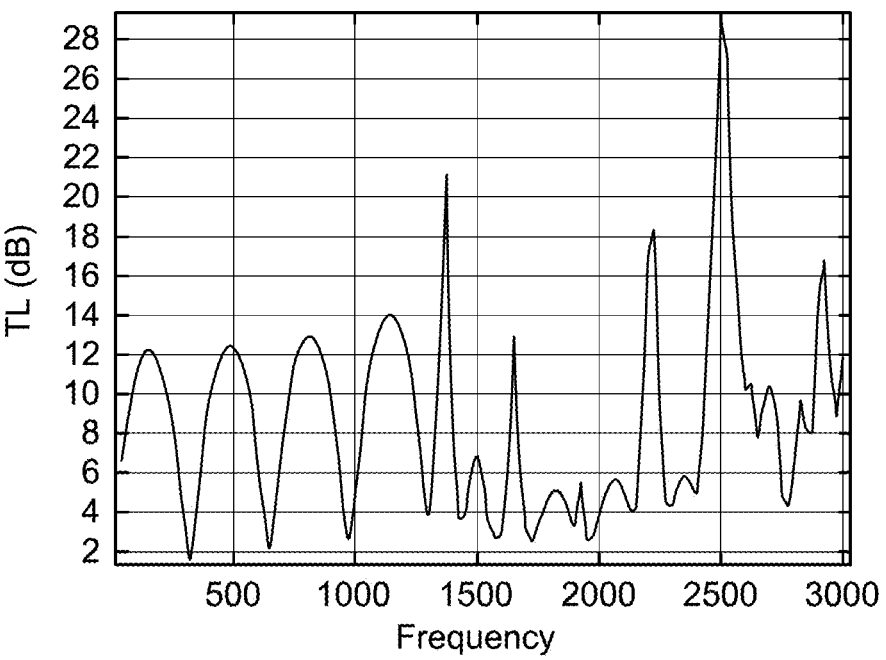
FIG. 9A is a graphical representation showing transmission loss (TL) characteristics of the traditional muffler of FIG. 7A across a frequency range of 0 to 3000 Hz.
Figure 9B:
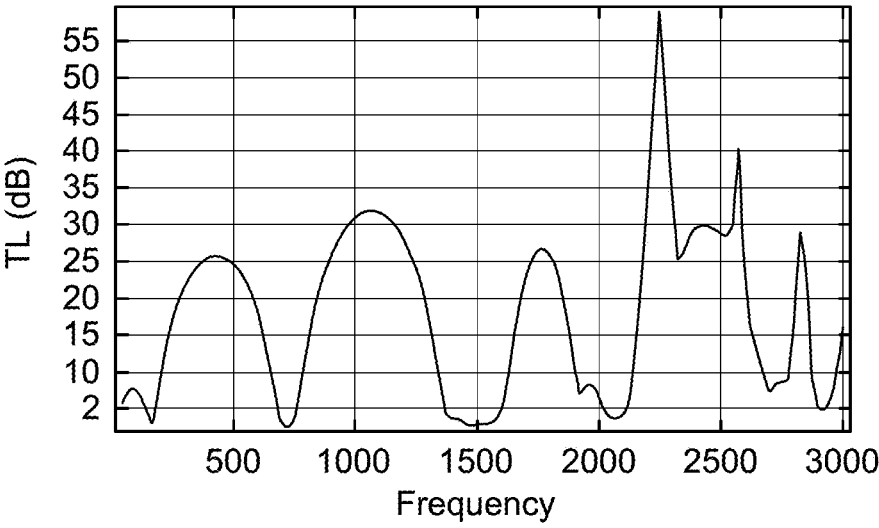
FIG. 9B is a graphical representation showing transmission loss (TL) characteristics of the first design concept of FIG. 7B across the frequency range of 0 to 3000 Hz, according to certain embodiments.
Figure 9C:
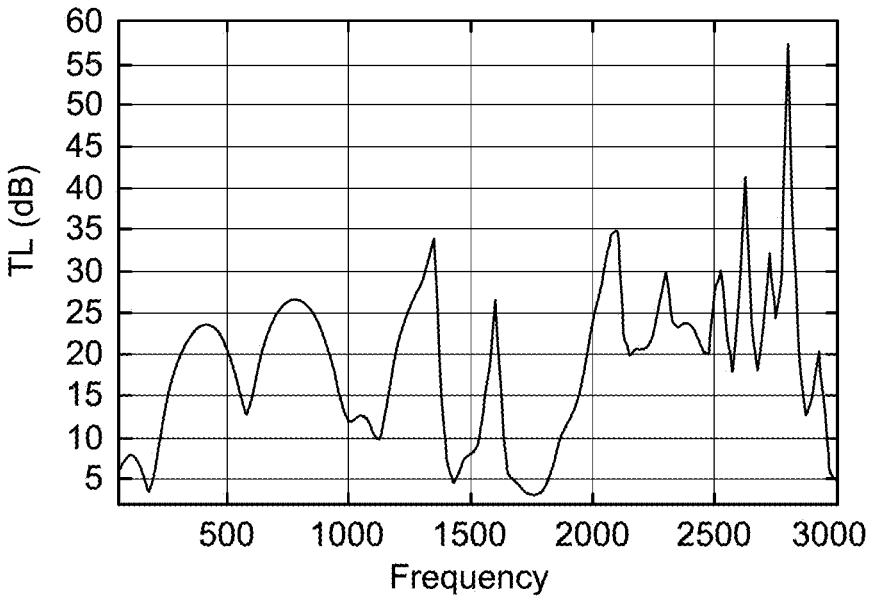
FIG. 9C is a graphical representation showing transmission loss (TL) characteristics of the second design concept of FIG. 7C across the frequency range of 0 to 3000 Hz, according to certain embodiments.
Figure 9D:
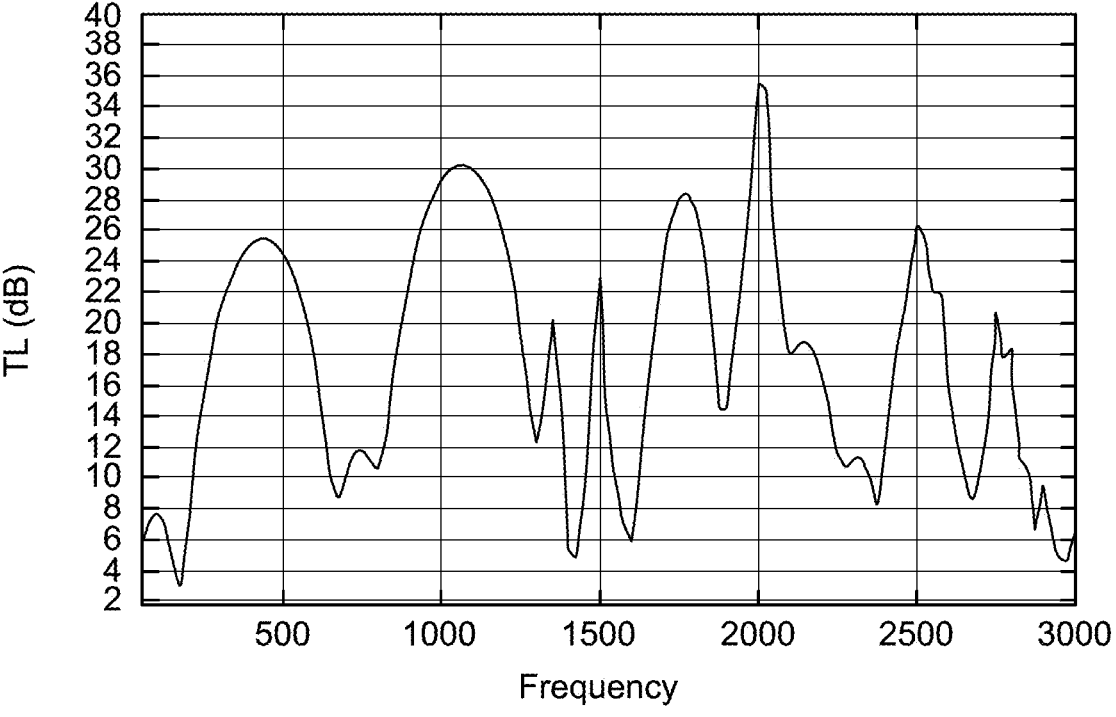
FIG. 9D is a graphical representation showing transmission loss (TL) characteristics of the third design concept of FIG. 7D across the frequency range of 0 to 3000 Hz, according to certain embodiments.

Referring to FIG. 7A through FIG. 7D and FIG. 8A through FIG. 8D, geometric and meshed configurations of four distinct muffler designs, each rendered in three-dimensional (3D) space are illustrated. FIG. 7A depicts a 3D model of a traditional muffler having a conventional cylindrical silencer structure comprising an inlet and outlet pipes. An overall axial length of the muffler may be approximately 600 mm. This configuration serves as a reference for evaluating acoustic performance of the noise cancelling device 100 of the present disclosure. A meshed configuration of the traditional muffler is illustrated in FIG. 8A. FIG. 7B depicts a 3D model of a first design concept having a dual-cylinder design connected by a reduced-diameter pipe which may be intended to enhance wave reflection and phase interference. A meshed configuration of the first design concept is illustrated in FIG. 8B. FIG. 7C depicts a 3D model of a second design concept having two cylindrical chambers connected via an offset pipe, introducing asymmetry into the flow path. This design may be intended to broaden the frequency response through complex wave interactions. A meshed configuration of the second design concept is illustrated in FIG. 8C. FIG. 7D depicts a 3D model of a third design concept having a conical transition section between two chambers. This tapered geometry may facilitate gradual impedance matching and extended wave interaction. A meshed configuration of the third design concept is illustrated in FIG. 8D. Each concept is dimensioned to support comparative evaluation of transmission loss, resonance behavior, and stopband tuning. These geometric variations form the basis for assessing the functional performance of the noise cancelling device 100 across different acoustic environments.

The primary goal of this validation effort is to demonstrate, through numerical simulations, that the adaptive muffler design offers superior transmission loss (i.e., greater noise attenuation) compared to traditional fixed designs across a relevant range of frequencies.

FIG. 9A through FIG. 9D illustrate the transmission loss (TL) characteristics of four distinct muffler configurations including the traditional muffler (shown in FIG. 9A), the first design concept (shown in FIG. 9B), the second design concept (shown in FIG. 9C), and the third design concept (shown in FIG. 9D) across a frequency range of 0 to 3000 Hz. Each graph represents TL in decibels (dB) as a function of frequency, demonstrating the acoustic attenuation performance of each design. The curves exhibit frequency-dependent behavior, with distinct peaks and troughs corresponding to resonant and anti-resonant conditions. These results validate the functional impact of geometric modifications on acoustic performance, confirming that the first, second and third design concepts enhanced transmission loss and broader stopband coverage compared to the traditional muffler design.

Figure 10A:
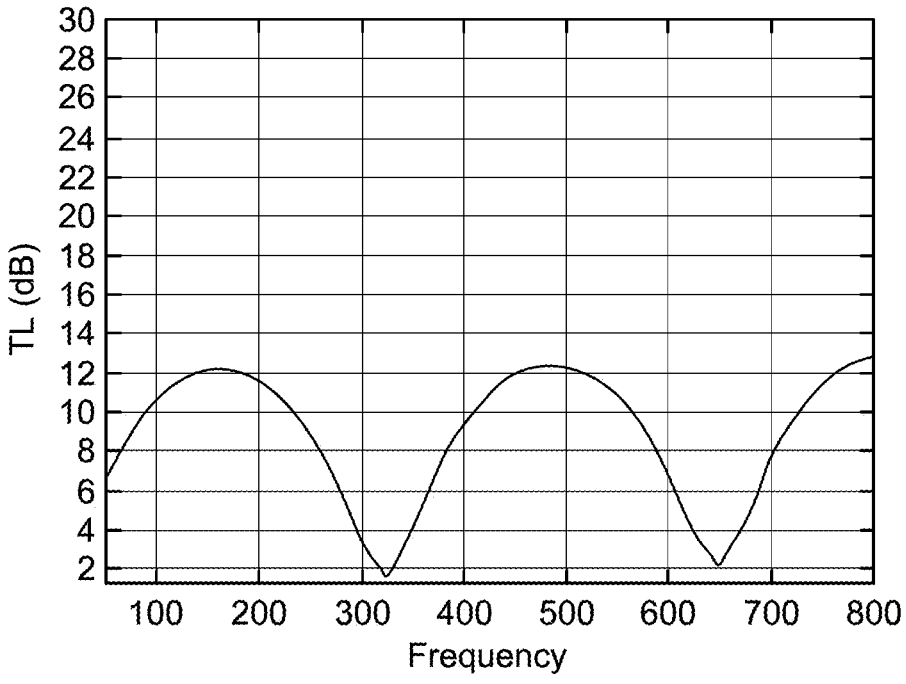
FIG. 10A is a graphical representation showing transmission loss (TL) characteristics of the traditional muffler of FIG. 7A across a frequency range of 50 to 800 Hz.
Figure 10B:
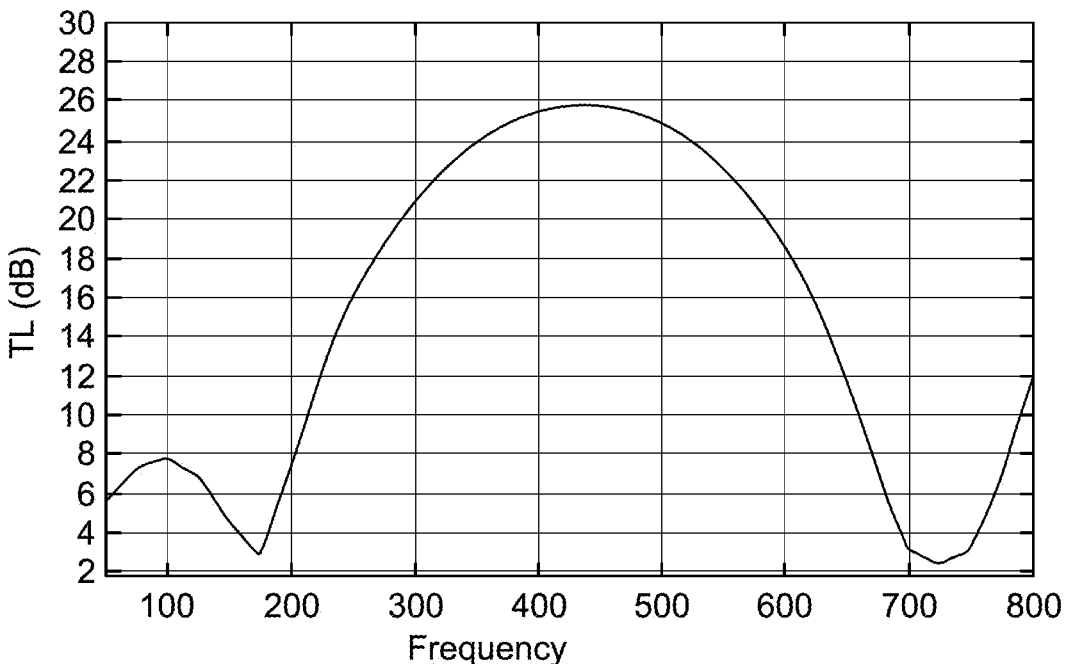
FIG. 10B is a graphical representation showing transmission loss (TL) characteristics of the first design concept of FIG. 7B across the frequency range of 50 to 800 Hz, according to certain embodiments.
Figure 10C:
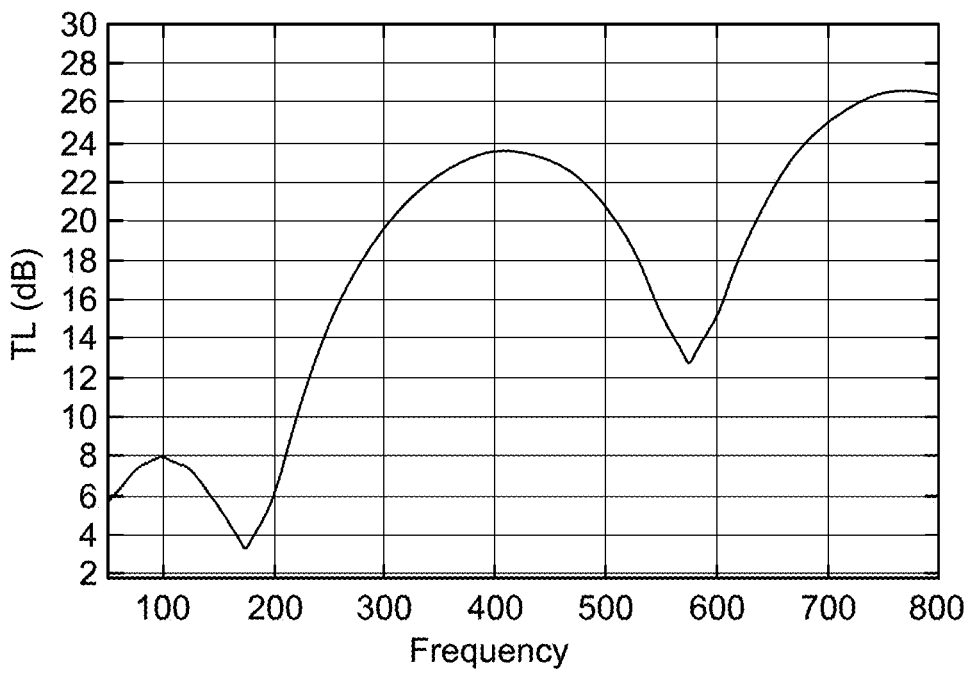
FIG. 10C is a graphical representation showing transmission loss (TL) characteristics of the second design concept of FIG. 7C across the frequency range of 50 to 800 Hz, according to certain embodiments.
Figure 10D:
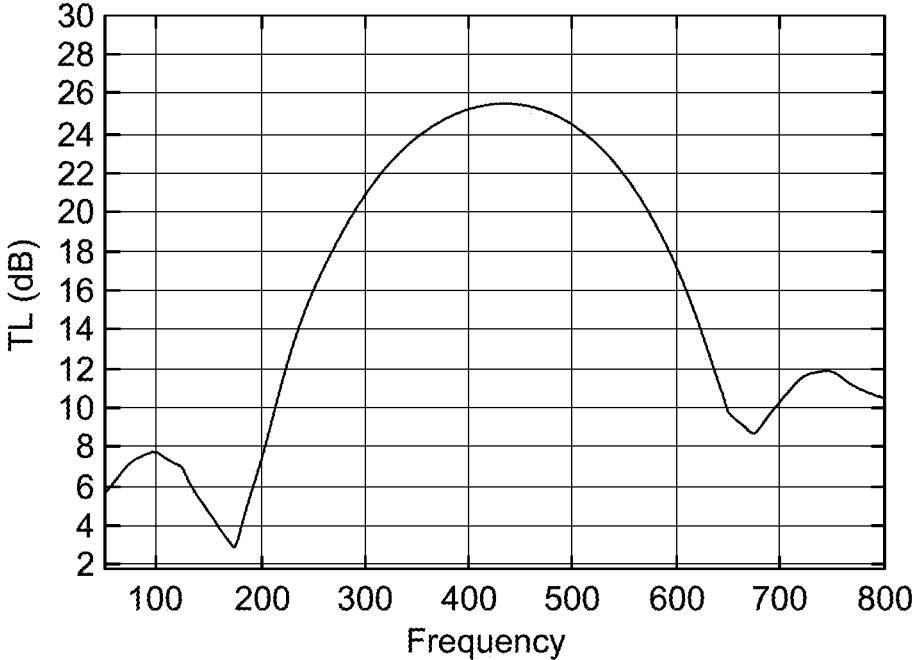
FIG. 10D is a graphical representation showing transmission loss (TL) characteristics of the third design concept of FIG. 7D across the frequency range of 50 to 800 Hz, according to certain embodiments.

FIG. 10A through FIG. 10D illustrate the transmission loss (TL) profiles of four distinct muffler configurations including the traditional muffler (shown in FIG. 10A), the first design concept (shown in FIG. 10B), the second design concept (shown in FIG. 10C), and the third design concept (shown in FIG. 10D) across a frequency range of 50 Hz to 800 Hz. Each graph plots TL in decibels (dB) against frequency, providing a comparative analysis of acoustic attenuation performance. FIG. 10A depicts multiple attenuation peaks, notably around 100 Hz, 400 Hz, and 700 Hz, indicating moderate performance across the spectrum. FIG. 10B exhibits a dominant TL peak near 400 Hz, indicating targeted attenuation at mid-range frequencies. FIG. 10C shows effective attenuation at both 100 Hz and a pronounced peak near 700-800 Hz, indicating broader frequency coverage. FIG. 10D achieves TL peaks at both low frequencies (100-200 Hz) and higher frequencies (600-700 Hz), reflecting enhanced multi-band attenuation capability. These results confirm that geometric modifications in the muffler design directly influence the frequency-dependent transmission loss characteristics. The data supports the functional advantage of the new models, particularly the third design concept, in achieving improved acoustic suppression across a wider frequency range, thereby validating their suitability for adaptive noise control applications in exhaust systems, compressors, and air handling units.

Using mathematical models derived from acoustic engineering principles, the simulations incorporate the physical dimensions of the muffler's expansion chambers, the material properties, and the control logic for adjusting chamber lengths in response to different "chirp" functions. The simulation results help to quantify the transmission loss of both the adaptive and traditional muffler systems, providing a clear comparison of their effectiveness in noise suppression. By validating the adaptive mechanism's performance numerically, this report aims to provide compelling evidence to support the patent application, underscoring the practical benefits and technological advancements embodied in the proposed design.

To perform a numerical validation for the "Adaptive Noise Cancelling/Silencing Mechatronic Mechanism" on a specific application like car muffler systems, the noise cancelling device 100 may be validated and compared with traditional techniques. An exemplary process for setting up the simulation of the noise cancelling device 100 may be given below:

Step 1: Define Simulation Setup

Model: Use the described mathematical model.

Parameters: Focus on the adaptive expansion chamber, including variables like chamber length adjustments via chirp functions.

Application: Car muffler systems.

Step 2: Implement the Simulation

Software: Use of Python or a similar tool for numerical simulation.

Baseline Model: Standard car muffler for comparison.

Step 3: Execute Simulation

Frequency Range: 0-3000 Hz, focusing on typical automotive operational frequencies.

Metrics: Measure transmission loss and compare it against the standard muffler.

Step 4: Analyze and Compile Results

Effectiveness: Highlight scenarios where the adaptive silencer outperforms the traditional system.

Visuals: Prepare graphs showing transmission loss across the frequency spectrum.

The code to simulate the performance of the adaptive expansion chamber is given below:

```
# Constants and Parameters
frequency range=np.linspace(0, 3000, 300)
# Frequency range from 0 to 3000 Hz
    k=2*np.pi*frequency_range/343 # Wave number,
    speed of sound in air ~343 m/s L1, L2, L3=0.5, 0.3, 0.4
    # Lengths of chambers in meters
# Area ratios for the expansion chambers (arbitrary cho-
    sen for demonstration)
m=1.2
n=1.4
# Transmission loss formula from the patent's description
def transmission loss(k, L1, L2, L3, m, n):
    #Calculate transmission loss using the provided com-
        plex formula
```

$$
\begin{aligned}
TL = 20*np.\log 10(np.abs((m+1/(24*m)*np.exp \\
(1j*k*L1)+1m**2/(4*m)*np.exp(-1j*k*L1)+ \\
n**2/(4*n)*np.exp(1j*(L2+L3))+1-n*(n+1)/ \\
(4*n)*np.exp(1j*(L3-L2))+(1+m)*(m-1)/ \\
(4*m)*np.exp(1j*L1)+(1-m)*(m+1)/(4*m)* \\
np.exp(-1j*L1)+(1-n)*(n+1)/(4*n)*np.exp(1j* \\
(L3-L2))+(1+n)*(n-1)/(4*n)*np.exp(-1j*(L2+ \\
L3)))))
\end{aligned}
$$

```
    return TL
#Transmission loss for the adaptive silencer
TL_adaptive=transmission_loss(k, L1, L2, L3, m, n)
#Transmission loss for a traditional fixed muffler, assum-
    ing fixed lengths and no adaptive mechanisms
TL traditional=transmission loss(k, L1, L2, L3, 1.0, 1.0)
    #Simple scenario with no area change
#Plotting the results
plt.figure(figsize=(12, 6))
plt.plot(frequency_range, TL_adaptive, label='Adaptive
    Expansion Chamber Silencer', linewidth=2)
plt.plot(frequency_range,            TL_traditional,
    label='Traditional Muffler', linestyle='- -', lin-
    ewidth=2)
plt.xlabel('Frequency (Hz)')
plt.ylabel('Transmission Loss (dB)')
``` plt.title('Comparison of Transmission Loss between Adaptive and Traditional Mufflers')
plt.legend( )
plt.grid(True)
plt.show( )

Figure 11:
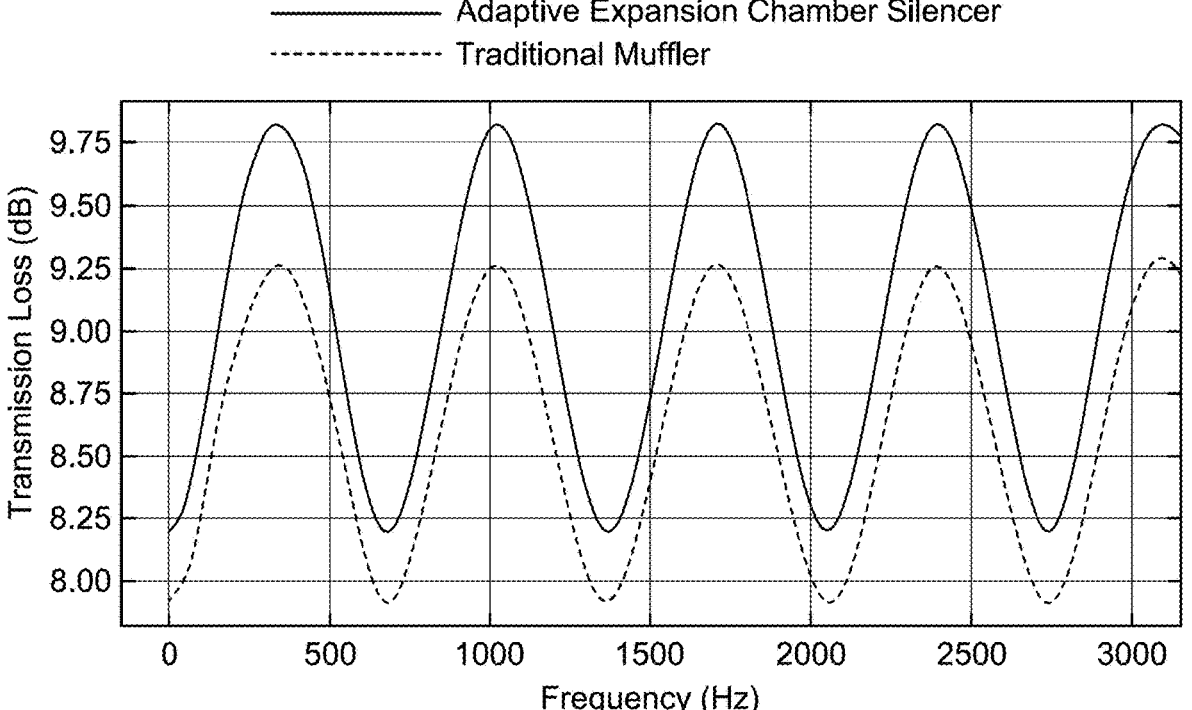
FIG. 11 is a graphical representation showing comparison of transmission loss between the noise cancelling device and the traditional muffler across the frequency range of 0 to 3000 Hz, according to certain embodiments.

Referring to FIG. 11, a graphical representation showing comparison of the transmission loss between the noise cancelling device 100 and the traditional muffler across a frequency range of 0 to 3000 Hz is illustrated. The noise cancelling device 100 is structurally configured to modify the effective length 'L' of its expansion chambers 101 in response to real-time acoustic input, thereby enabling dynamic tuning of its resonant characteristics. This capability allows the noise cancelling device 100 to achieve elevated TL values at specific frequency bands, demonstrating enhanced attenuation of noise components that align with the input signal's spectral profile. Whereas, the traditional muffler exhibits a relatively uniform TL response across the frequency spectrum, with generally lower attenuation levels. This indicates limited adaptability and reduced effectiveness in suppressing noise across varying operational conditions. The comparison analysis, as shown in FIG. 11, confirms that the noise cancelling device 100 provides better acoustic performance by aligning its structural configuration with the dominant noise frequencies, thereby optimizing transmission loss and expanding the effective stopband range.

According to the present disclosure, an adaptive acoustic attenuation system such as noise cancelling device 100, particularly suited for vehicular applications, is illustrated, wherein simulation-based validation has demonstrated enhanced performance characteristics under variable noise conditions. The noise cancelling device 100 incorporates a dynamically adjustable muffler mechanism, governed by real-time acoustic feedback, to optimize noise suppression across a broad frequency range. The noise cancelling device 100 consistently achieved higher transmission loss values across the broad frequency spectrum (0-3000 Hz) compared to a traditional muffler. This indicates a more effective reduction of acoustic noise, particularly in frequencies that are most problematic in automotive applications. Further, the ability of the noise cancelling device 100 to adjust the length 'L' of the expansion chambers 101 in real-time, based on the acoustic feedback (chirp functions), allows it to respond to varying noise conditions more effectively than static systems. This adaptability not only improves noise reduction but also enhances the overall efficiency of the silencing system. Further, the simulation results show that the adaptive design of the noise cancelling device 100 can be implemented for commercial applications and widespread adoption of the technology.

The adaptive noise control technology disclosed in the present disclosure has diverse commercial applications across multiple industries. In the automotive sector, it enables dynamic mufflers to reduce engine and road noise for improved comfort and regulatory compliance. In industrial manufacturing, it supports customizable silencing systems tailored to machinery and operational noise levels. HVAC systems benefit from adaptive dampening modules that respond to airflow variations to enhance environmental comfort. Construction sites can utilize portable noise control solutions adaptable to different equipment and ambient conditions, helping mitigate urban sound pollution. In consumer electronics, compact adaptive noise cancelling devices enhance user experience by minimizing appliance and audio system noise.

Figure 12:
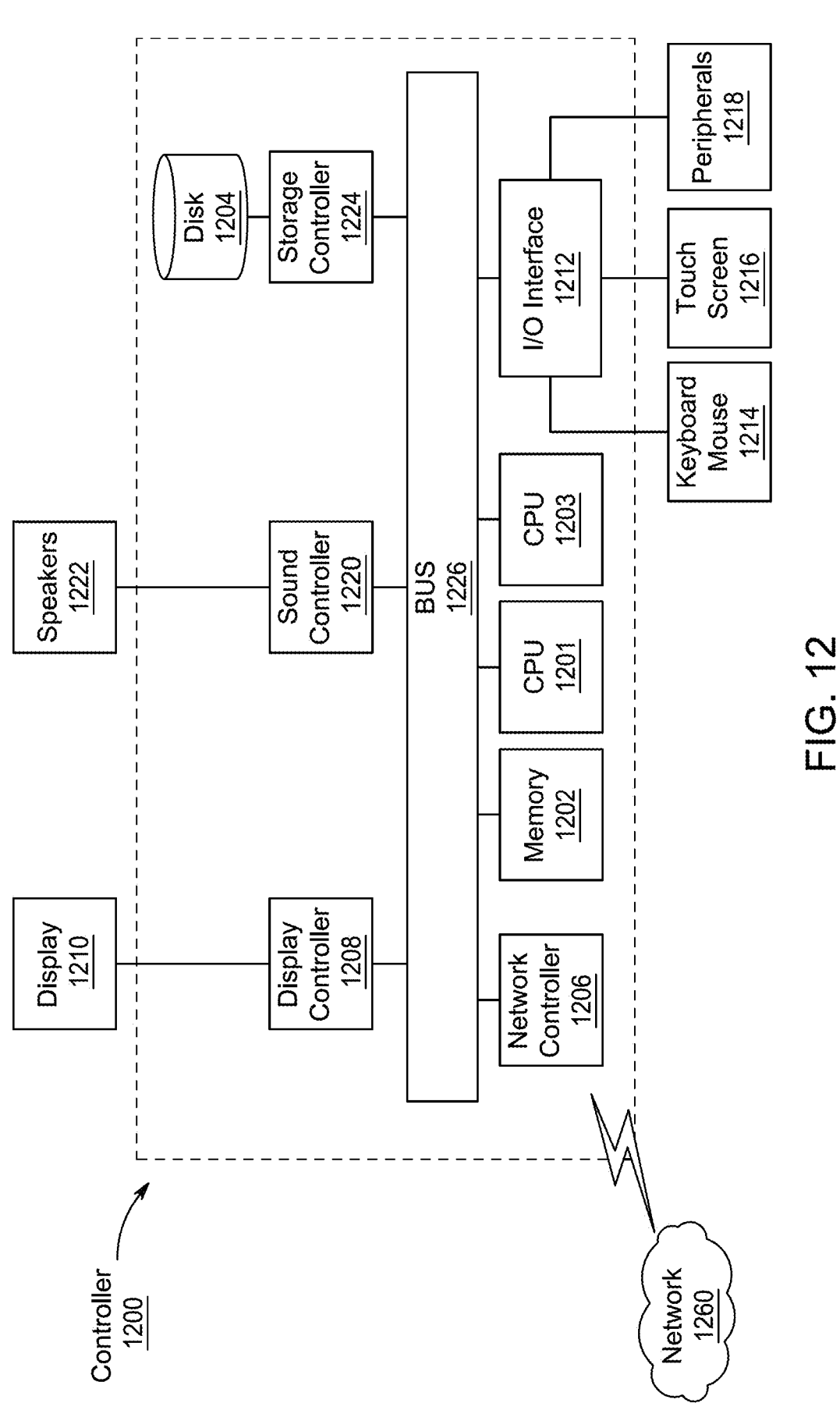
FIG. 12 is an illustration of a non-limiting example of details of computing hardware used in the control system, according to certain embodiments.

Next, further details of the hardware description of the computing environment according to exemplary embodiments are described with reference to FIG. 12. In FIG. 12, a controller 1200 is representative of the controller 310 of FIG. 3 in which the controller is a computing device which includes a CPU 1201 which performs the processes described above/below. The process data and instructions may be stored in memory 1202. These processes and instructions may also be stored on a storage medium disk 1204 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1201, 1203 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skill in the art would recognize. Further, CPU 1201, 1203 may be implemented as multiple processors cooperatively working in parallel to perform the instructions of the inventive processes described above.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 13:
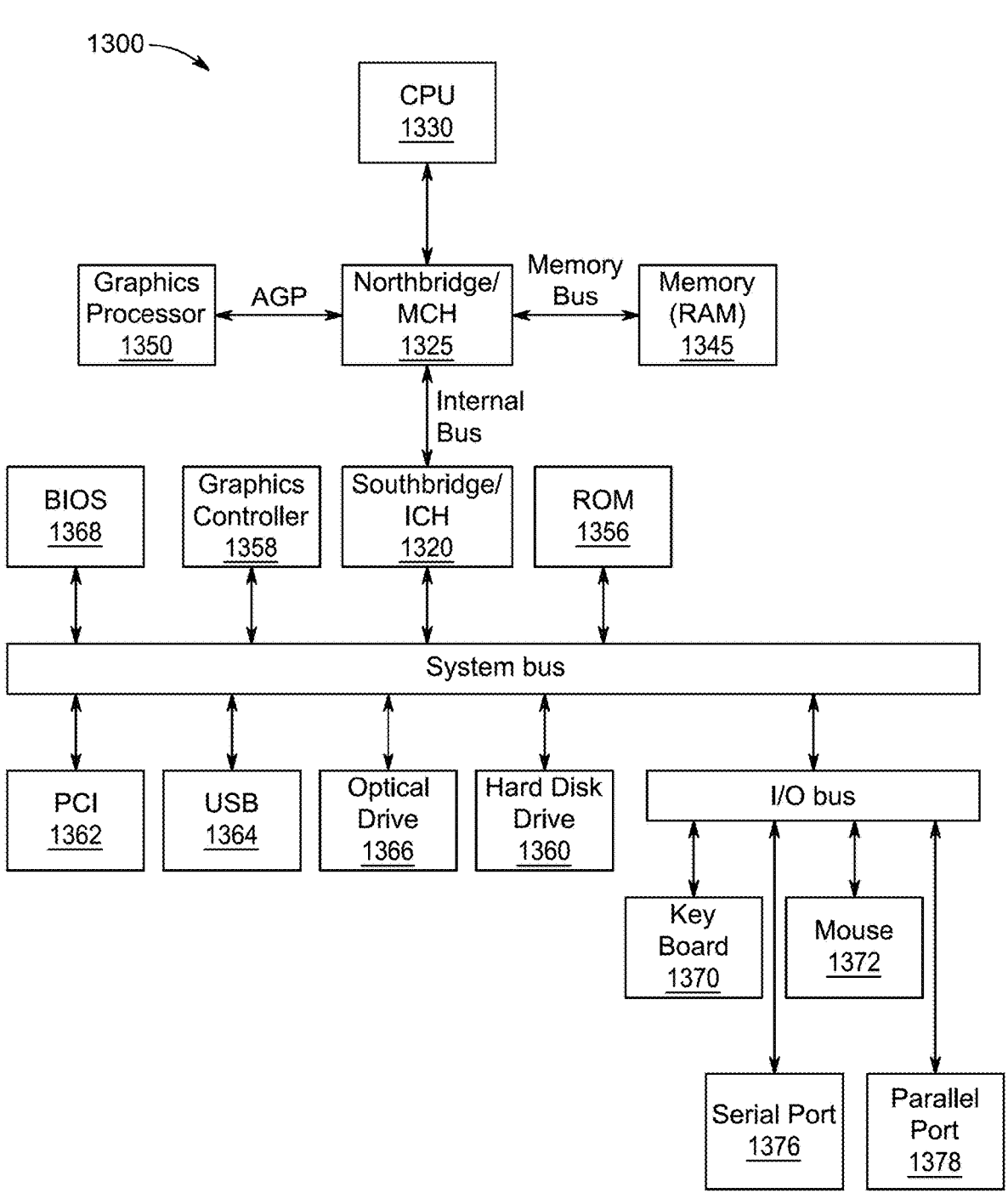
FIG. 13 is an exemplary schematic diagram of a data processing system used within the control system, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
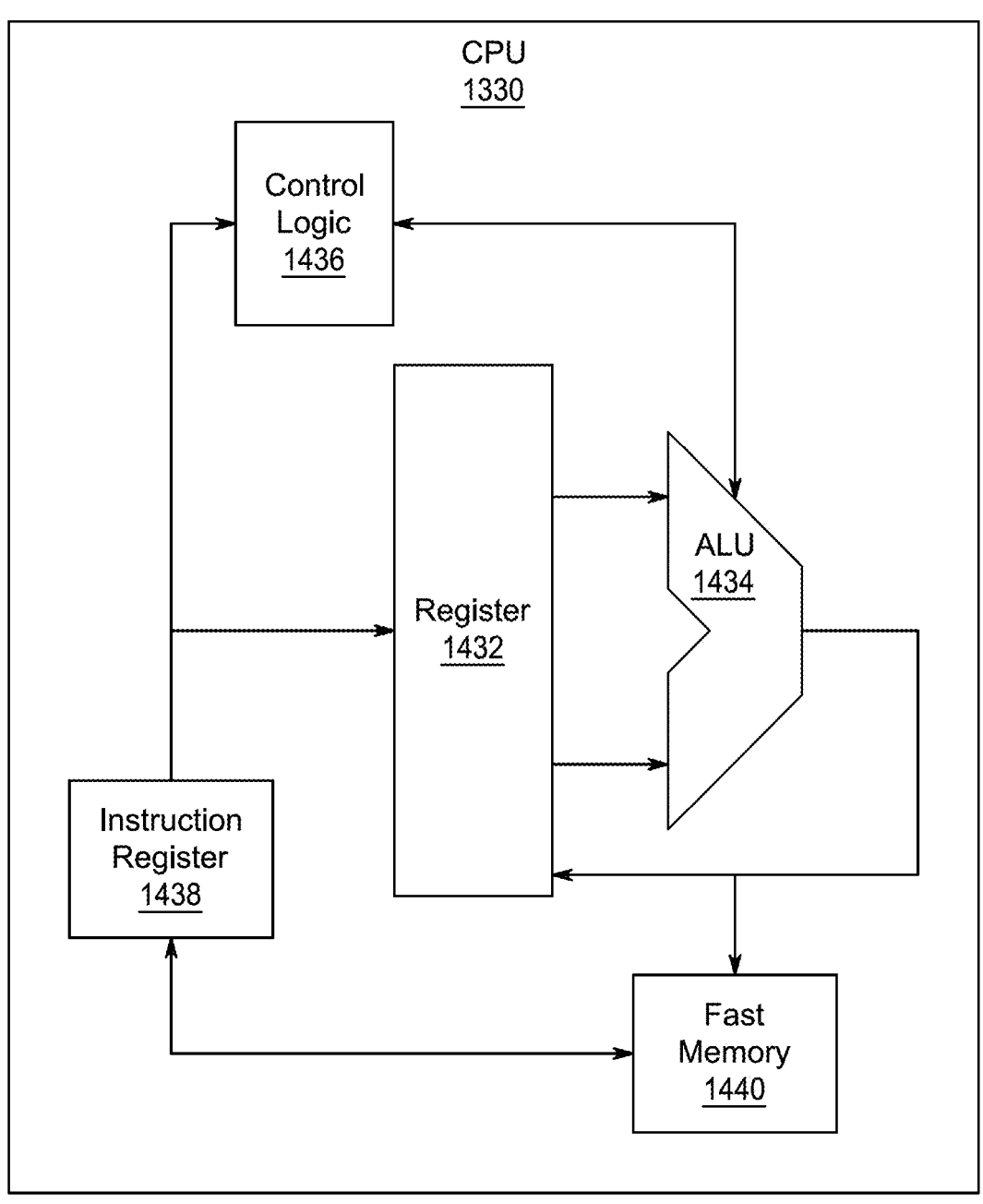
FIG. 14 is an exemplary schematic diagram of a processor used with the control system, according to certain embodiments.

For example, FIG. 14 shows one implementation of CPU 1330. In one implementation, the instruction register 1438 retrieves instructions from the fast memory 1440. At least part of these instructions are fetched from the instruction register 1438 by the control logic 1436 and interpreted according to the instruction set architecture of the CPU 1430. Part of the instructions can also be directed to the register 1432. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 1388 through a PCI bus 1362.

The PCI devices may include, for example, Ethernet adapters, add-in cards, and PC cards for notebook computers. The Hard disk drive 1360 and CD-ROM 1366 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 15:
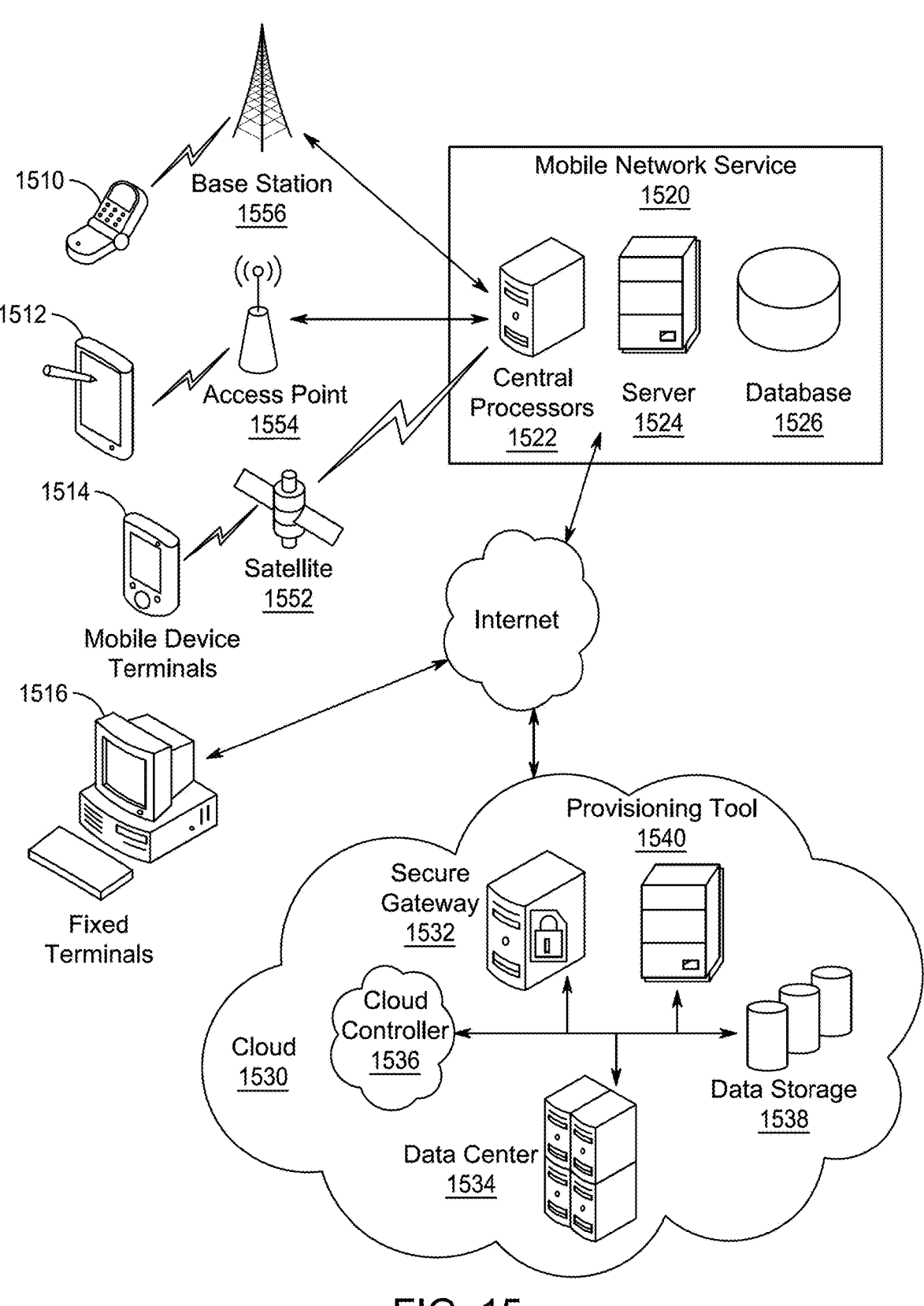
FIG. 15 is an illustration of a non-limiting example of distributed components which may share processing with a controller of the control system, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1530 including a cloud controller 1536, a secure gateway 1532, a data center 1534, data storage 1538 and a provisioning tool 1540, and mobile network services 1520 including central processors 1522, a server 1524 and a database 1526, which may share processing, as shown by FIG. 15, in addition to various human interface and communication devices (e.g., display monitors 1516, smart phones 1510, tablets 1512, personal digital assistants (PDAs) 1514). The network may be a private network, such as a LAN, satellite 1552 or WAN 1554, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A noise cancelling device, comprising:
   a first expansion chamber and a second expansion chamber, each having a cylindrical shape with a first end and a second end;
   an inlet extension pipe having a double wall, connected to the first end of the first expansion chamber;

an outlet extension pipe having a double wall, connected to the first end of the second expansion chamber; and a connecting pipe, connecting the second end of the first expansion chamber and the second end of the second expansion chamber;

wherein each expansion chamber comprises:

a first element comprising:

a first cylindrical portion having a double wall and a first diameter;

a first circular base connecting to the first cylindrical portion;

a second cylindrical portion connecting to the first circular base having a double wall and a second diameter, wherein the first and second cylindrical portions are axially aligned;

wherein the first diameter is larger than the second diameter;

wherein the first cylindrical portion has an extending outer lip;

wherein the second cylindrical portion is slidingly engaged with the extension pipe; and wherein an inner wall of the second cylindrical portion is disposed in a gap of the double wall of the extension pipe;

a second element comprising:

a third cylindrical portion having a third diameter; and a second circular base connecting to the third cylindrical portion and the connecting pipe, wherein the second element is slidingly engaged in a gap of the double wall of the first element to form a cylindrical body; and wherein each of the expansion chambers, the connecting pipe, and the extension pipes have an inner diameter and an outer diameter;

wherein the expansion chambers, the connecting pipe, and the extension pipes form a unitary body, wherein the expansion chambers, the connecting pipe, and the extension pipes are axially aligned along a longitudinal axis of all the cylindrical portions in the order of inlet extension pipe, first expansion chamber, connecting pipe, second expansion chamber, and outlet extension pipe, having a plane of symmetry perpendicular to the longitudinal axis at a center point of the connecting pipe.

2. The noise cancelling device of claim 1, wherein the connecting pipe and the second cylindrical portion of each expansion chamber have the same inner diameter.

3. The noise cancelling device of claim 1, wherein the first element of each expansion chamber is movable, and an elastomeric lining is present between an inner contacting surface of the first element and the second element to form an interior surface having a single diameter when the elastomeric lining is in a resting state.

4. The noise cancelling device of claim 1, wherein the expansion chambers are configured to be extended or retracted by adjusting a length of the expansion chamber.

5. The noise cancelling device of claim 1, wherein the connecting pipe is a fix-length pipe.

6. The noise cancelling device of claim 1, wherein the connecting pipe and each of the expansion chambers have the same length at a default position.

7. The noise cancelling device of claim 1, wherein the connecting pipe has an inner diameter smaller than the inner diameter of the expansion chamber.

8. The noise cancelling device of claim 1, wherein each extension pipe further comprises a plurality of springs configured to return the first element of each expansion chamber at the default position.

9. The noise cancelling device of claim 1, wherein each extension pipe has an inner diameter smaller than the inner diameter of the expansion chamber.

10. The noise cancelling device of claim 1, wherein the inner diameter of each extension pipe is the same as the inner diameter of the connecting pipe.

11. The noise cancelling device of claim 1, further comprising:

a control system to actuate a size of the expansion chamber by adjusting a length of the expansion chamber, comprising:

a controller;

an actuator mounted on an outer wall of the extension pipe and connected to the first base of the expansion chamber through a cable; and a sensor for the expansion chamber on the actuator;

wherein the controller includes a circuitry configured to receive and process data from the sensor and giving commands to the actuator;

wherein the actuator is configured to execute commands from the controller to adjust the length of each expansion chamber; and wherein the actuator is configured to detect the length of the expansion chamber.

12. The noise cancelling device of claim 1, wherein the controller receives the data from the sensor either through a cable or a wireless transmission.

13. The noise cancelling device of claim 1, wherein the controller gives commands to the actuator through a cable or a wireless transmission.

14. The noise cancelling device of claim 1, wherein the controller gives commands based on a chirp function's feedback.

15. The noise cancelling device of claim 1, wherein a transmission loss in the noise cancelling device follows a mathematical description as:

$$TL_{double\ chamber} =$$

$$20Log_{10}\left[\left(\frac{(m+1)^2}{4m}e^{ikL_1} + \frac{(1-m)(m-1)}{4m}e^{-ikL_1}\right)\left(\frac{(1+n)^2}{4n}e^{ik(L_2+L_3)} + \right.\right.$$

$$\left.\frac{(1-n)(n-1)}{4n}e^{ik(L_2-L_3)}\right) + \left(\frac{(1+m)(m-1)}{4m}e^{ikL_1} + \frac{(1-m)(m+1)}{4m}e^{-ikL_1}\right)$$

$$\left.\left(\frac{(1-n)(n+1)}{4n}e^{ik(L_3-L_2)} + \frac{(1+n)(n-1)}{4n}e^{-ik(L_2+L_3)}\right)\right],$$

wherein i is the standard imaginary unit;

wherein m represents an area ratio between the first expansion chamber and the connecting pipe;

wherein n represents an area ratio between the second expansion chamber and the connecting pipe;

wherein L1 represents the length of the first expansion chamber;

wherein L2 represents the length of the connecting pipe; and wherein L3 represents the length of the second expansion chamber.

16. The noise cancelling device of claim 1, wherein the device has a stopband location either to a left or right of the center frequency within a frequency spectrum of 0 to 5000 Hz.

17. The noise cancelling device of claim 1, wherein the expansion chambers are capable of adjusting their lengths in real-time.

18. A method of noise reduction on a system providing a flow of gas using the noise cancelling device of claim 1, comprising:

connecting the noise cancelling device to a gas exhaust/flow to generate acoustic signals;

processing the acoustic signals to generate a feedback; and adjusting the lengths of expansion chamber based on the feedback to reduce the noise.

19. The method of claim 18, reduces noise within a frequency spectrum of 0 to 5000 Hz.

20. The method of claim 18, wherein the system provides a flow of gas selected from the group consisting of exhaust system, car muffler system, air handling system, ducted pumps, air discharge line, and compressors.

\* \* \* \* \*